(12) United States Patent
Shadmon et al.

(10) Patent No.: US 7,287,033 B2
(45) Date of Patent: Oct. 23, 2007

(54) EFFICIENT TRAVERSALS OVER HIERARCHICAL DATA AND INDEXING SEMISTRUCTURED DATA

(75) Inventors: Moshe Shadmon, Tel Aviv (IL); Neal Sample, Santa-Cruz, CA (US)

(73) Assignee: ORI Software Development, Ltd., Tel Aviv (IL)

(*) Notice: Subject to any disclaimer, the term of this patent is extended or adjusted under 35 U.S.C. 154(b) by 434 days.

(21) Appl. No.: 10/379,002

(22) Filed: Mar. 5, 2003

(65) Prior Publication Data
US 2003/0204515 A1    Oct. 30, 2003

Related U.S. Application Data

(60) Provisional application No. 60/361,700, filed on Mar. 6, 2002.

(51) Int. Cl.
G06F 17/00 (2006.01)
(52) U.S. Cl. .............. 707/101; 707/102; 715/514
(58) Field of Classification Search ........... 707/103, 707/102, 3, 1, 100
See application file for complete search history.

(56) References Cited

U.S. PATENT DOCUMENTS

| | | | |
|---|---|---|---|
| 4,606,002 A | 8/1986 | Waisman et al. | |
| 4,611,272 A | 9/1986 | Lomet | |
| 4,945,475 A | 7/1990 | Bruffey et al. | |
| 5,058,144 A | 10/1991 | Fiala et al. | |
| 5,202,986 A | 4/1993 | Nickel | |
| 5,230,047 A | 7/1993 | Frey, Jr. et al. | |
| 5,257,365 A | 10/1993 | Powers et al. | |
| 5,295,261 A | 3/1994 | Simonetti | |
| 5,333,317 A | 7/1994 | Dann | |
| 5,377,281 A | 12/1994 | Ballard et al. | |
| 5,392,363 A | 2/1995 | Fujisaki et al. | |
| 5,404,510 A | 4/1995 | Smith et al. | |

(Continued)

FOREIGN PATENT DOCUMENTS

WO    WO98/04980    2/1998

(Continued)

OTHER PUBLICATIONS

Donald Knuth, "The Art of Computer Programming", vol. 3, Sorting and Searching, 1973, pp. 471-479, 490-499, 501-504.

(Continued)

*Primary Examiner*—Alford W. Kindred
(74) *Attorney, Agent, or Firm*—Oliff & Berridge, PLC

(57) ABSTRACT

A method for encoding hierarchical data stored in an index, partitioned into blocks, over keys representing the data. For every key K representing a record R in the index, the key of the children records of record R are prefixed with K. The method includes traversing to a first R record represented in the index, traversing from the record R to the next sequential R such that the path in the index from the position representing R to the position representing the next sequential R does not include information relating to the children of R. Next, repeating the latter operation for 0 or more R records, and for any 0 or more particular R records, traversing from the particular R to its children. The index constitutes a balanced structure of blocks.

22 Claims, 14 Drawing Sheets

U.S. PATENT DOCUMENTS

| | | | |
|---|---|---|---|
| 5,418,947 | A | 5/1995 | Hsu et al. |
| 5,487,166 | A | 1/1996 | Cossock |
| 5,488,717 | A | 1/1996 | Gibson et al. |
| 5,495,609 | A | 2/1996 | Scott |
| 5,497,485 | A * | 3/1996 | Ferguson et al. ............... 707/1 |
| 5,528,701 | A | 6/1996 | Aref |
| 5,530,957 | A | 6/1996 | Koenig |
| 5,534,861 | A | 7/1996 | Chang et al. |
| 5,551,027 | A | 8/1996 | Choy et al. |
| 5,557,786 | A | 9/1996 | Johnson, Jr. |
| 5,560,007 | A | 9/1996 | Thai |
| 5,644,763 | A | 7/1997 | Roy |
| 5,649,023 | A | 7/1997 | Barbara et al. |
| 5,651,099 | A | 7/1997 | Konsella |
| 5,664,172 | A | 9/1997 | Antoshenkov |
| 5,694,591 | A | 12/1997 | Du et al. |
| 5,701,467 | A | 12/1997 | Freeston |
| 5,717,921 | A | 2/1998 | Lomet et al. |
| 5,737,732 | A | 4/1998 | Gibson et al. |
| 5,752,243 | A * | 5/1998 | Reiter et al. .................... 707/3 |
| 5,761,652 | A | 6/1998 | Wu et al. |
| 5,765,168 | A | 6/1998 | Burrows |
| 5,768,423 | A | 6/1998 | Aref et al. |
| 5,781,772 | A | 7/1998 | Wilkinson, III et al. |
| 5,787,430 | A | 7/1998 | Doeringer et al. |
| 5,799,184 | A | 8/1998 | Fulton et al. |
| 5,799,299 | A | 8/1998 | Fujiwara |
| 5,809,296 | A | 9/1998 | Yong et al. |
| 5,832,182 | A | 11/1998 | Zhang et al. |
| 5,842,196 | A | 11/1998 | Agarwal et al. |
| 5,848,416 | A | 12/1998 | Tikkanen |
| 5,873,087 | A | 2/1999 | Brosda et al. |
| 5,884,297 | A | 3/1999 | Noven |
| 5,963,956 | A | 10/1999 | Smartt |
| 5,970,170 | A | 10/1999 | Kadashevich et al. |
| 6,014,659 | A * | 1/2000 | Wilkinson et al. ............. 707/3 |
| 6,041,053 | A * | 3/2000 | Douceur et al. ............ 370/389 |
| 6,153,591 | A | 11/2000 | Cai et al. |
| 6,175,835 | B1 | 1/2001 | Shadmon |
| 6,208,993 | B1 | 3/2001 | Shadmon |
| 6,240,418 | B1 | 5/2001 | Shadmon |
| 6,560,610 | B1 * | 5/2003 | Eatherton et al. ......... 707/104.1 |
| 6,654,734 | B1 * | 11/2003 | Mani et al. ..................... 707/2 |
| 6,697,363 | B1 * | 2/2004 | Carr ........................... 370/389 |
| 6,735,595 | B2 * | 5/2004 | Gobeille et al. ............ 707/102 |
| 6,816,856 | B2 * | 11/2004 | Baskins et al. ................. 707/4 |
| 6,859,455 | B1 * | 2/2005 | Yazdani et al. ............. 370/392 |
| 2002/0120598 | A1 | 8/2002 | Shadmon et al. |

FOREIGN PATENT DOCUMENTS

| | | |
|---|---|---|
| WO | WO99/38094 | 7/1998 |

OTHER PUBLICATIONS

Orcle 9i Index-Organized Tables, Technical Whitepaper, Sep. 2001.
Peter Blumulis et al., "A Compact B-tree" SIGMOD Conference, Jun. 3-6, 2002, 9 pages.
Horowitz and Shani, "Fundamentals of Data Structures", Computer Science Press, 1976.
P. Ferragina et al., "An experimental study of SB-trees", (Jun. 1996), NECResearchIndex.
Rumbaugh J. et al., "Object Oriented Modeling and Design", Chap. 3, pp. 21-56, 1987.
H.F. Korth et al., "Database System Concepts", 1986, Chapters 3-5 and 7-8, pp. 45-172 and 229-299.
G. Wiederhold, "File Organization for Database Design", 1987, pp. 272, 273.
J.D. Ullman, "Physical Data Organization Principles of Database Systems", Jan. 1980, pp. 30-51.
Harder, Theo, "Implenetierung von Operationalen Schnittstellen", in: Lockemann, P.C., Schmidt, J.W.: Daten bank-Handbuch, Chapter 3, here: pp. 238-243 1987, SPRINGER, Berlin, Germany, translation into English enclosed.
P. Ferragina et al., "A Fully-Dynamic Data Structure for External Substring Search" ACM Symposium on Theory of Computing (1995), pp. 693-702.
P. Ferragina et al., "The String B-Tree: A new Data Structure for String Search in External Memory and its Applications", Journal of the ACM 46 (2), Mar. 1999, pp. 236-280.
Arne Andersson et al., "Efficient Implementation of Suffix Trees", Software-Practice and Experience, vol. 25, No. 2, Feb. 1995, pp. 129-141.
Witold A. Litwin et al., "Trie Hashing With Controlled Load", IEEE Transactions on Software Engineering, vol. 17, No. 7, Jul. 1991, pp. 678-691.
Donald Knuth, "The Art of Computer Programming", vol. 3, Sorting and Searching, 1973, pp. 481-505, 681-687.
Donald Knuth, "The Art of Computer Programming", vol. 3, Sorting and Searching, 1973, pp. 552-559.
Houghton Mifflin Company, The American Heritage Dictionary of the English Language, Third Edition, 1996, "Of or relating to meaning, especially meaning in language."
Buneman et al., "Keys for XML", Aug. 2000.
Banerjee et al., "Oracle8i—The XML Enabled Data Management System", 2000, 8 pages.
Josephine Cheng et al., "XML and DB2", 2000, 5 pages.
Serge Abiteboul et al., "The Lorel Query Language for Semistructured Data.", International Journal on Digital Libraries, 1(1), Department of Computer Science, Stanford University, Apl. 1997, pp. 68-88.
James Clark et al., XML Path Language (Xpath), Version 1. 0, W3C Recommendation 16, Nov. 1999, pp. 1-48.
Don Chamberlain et all, "Quilt: An XML Query Language for Heterogeneous Data Sources", International Workshop on Web and Databases (WebDB'2000), Dallas, Texas, May 2000, 25 pages.
Siberschatz A. et al., "Database Systems Concepts", Chapter 7, pp. 215-250, WCB McGraw-Hill, Third Edition, 1997.
Girardot M. et al., "Millau: An Encoding Format for Efficient Representation and Exchange of XML over the Web", Computer Networks and ISDN Systems, North Holland Publishing, Amsterdam, NL, vol. 33, No. 1-6, Jun. 2000, pp. 747-765.
Liefke H. et al., "XMILL: An Efficient Compressor for XML Data", Sigmond Record, Association for Computing Machenery, New York, US, vol. 29, No. 2, Jun. 2000, pp. 153-164.

* cited by examiner

US 7,287,033 B2

EFFICIENT TRAVERSALS OVER HIERARCHICAL DATA AND INDEXING SEMISTRUCTURED DATA

FIELD OF THE INVENTION

The present invention is in the general field of traversals over hierarchical data, indexing and accessing semistructured data and hierarchical data.

BACKGROUND OF THE INVENTION

A discussion on indexing can be found in *The Art of Computer Programming*, volume 3/*Sorting and Searching*, by Donald Knuth (©1973, Addison-Wesley). More specifically, a discussion on B-trees can be found on pages 473-479, a trie is discussed on pages 481-490, and a discussion on Patricia structure can be found on pages 490-499.

SUMMARY OF THE INVENTION

The invention provides for in a storage medium used by a database file management system executed on data processing system, a data structure comprising: an index, partitioned into blocks, over keys representing hierarchical data; leaf blocks of said index are associated with data records; said hierarchical data is represented by keys of type $K(i)$ as a parent and for each parent 0 or more children of the type $K(i)+J(1) \ldots K(i)+J(n)$; in order to satisfy a query for parents data, it is possible to traverse from a link of a parent $K(i)$ to a link of the sequentially next parent $K(i+1)$, skipping over links to the children $K(i)+J(1) \ldots K(i)+J(n)$; to satisfy a query for a parent and his children, the index further supports a traversal from $K(i)$ to the children $J(1) \ldots J(n)$ of said $K(i)$; said index maintains the key order; said index constitutes an essentially balanced structure of blocks.

The invention further provides in a storage medium used by a database file management system executed on data processing system, that includes: a tree based index, partitioned into blocks, over keys representing hierarchical data;
said keys include keys of parent records; one or more parent records have children such that a key of each child record is prefixed by the key of its parent;
said index includes a sub-index such that the sub-index is an index over the keys of the children of a parent;
said index maintains an essentially balanced structure of blocks;
a method for searching in the index by a key; said key is the prefix of the key of one or more parents including:
retrieving a first parent;
said method is further capable, if the first parent has children, to retrieve the children of said first parent;
said method is further capable, if a next parent is available, to retrieve the next parent skipping over the children of the first parent.

Still further, the invention provides for a method for encoding hierarchical data using an index partitioned into blocks, over the keys representing the data;
for every key K representing a record R in said index, the key of the children records of R are prefixed with K; the method comprising:
(i) traversing to a first R record represented in the index;
(ii) traversing from said R to the next sequential R such that the path in the index from the position representing R to the position representing the next sequential R does not include information relating to the children of R;
(iii) repeating step (ii) for 0 or more R records;
(iv) for any 0 or more particular R records, traversing from the particular R to its children;
said index constitutes a balanced structure of blocks.

Yet further, the invention provides for a method for encoding semi-structured data and/or hierarchical data, comprising a layered index partitioned into blocks over keys representing the said data;
the leaf layer of the said layered index includes at least a sparse trie; the method comprising performing a range search such that nodes are traversed depth first post order;
said range search is capable to identify and ignore subtries that index keys not relevant to a search criterion. said index constitutes an essentially balanced structure of blocks.

BRIEF DESCRIPTION OF THE DRAWINGS

For a better understanding, the invention will now be provided, by way of example only, with reference to the accompanying drawings, in which.

DETAILED DESCRIPTION OF THE INVENTION

One of the most popular index schemes is B-tree. Most table-based DBMSs use Btree as one of the major index schemes. However, semi-structured data (such as XML data) is more complicated to index and search than tables based data. A query over semi-structured data (as well as queries over other types of data) is usually evaluated in terms of efficiency. As it was explained in the U.S. Patent Publication US20020120598 A1 published Aug. 29, 2002 and entitled "Encoding Semi-Structured Data For Efficient Search and Browse" (herein the Semi-Structured Publication), whose contents in its entirety is incorporated herein by reference. The first paragraph of the summary of the Semi-Structured Publication (Col. 5 [0087]) defines efficiency as:

"efficient access means the ability to locate relevant data in a short amount of time or with only a small number (e.g., several) disk accesses, even though the data items stored may number in the millions or more, or even though the total size of the data items is such that they cannot all fit in the memory available to the search process. Efficient access refers to the overall or typical behavior of the system. In other words, while individual accesses may sometimes be inefficient, the access behavior observed over time is efficient."

Figure 7:
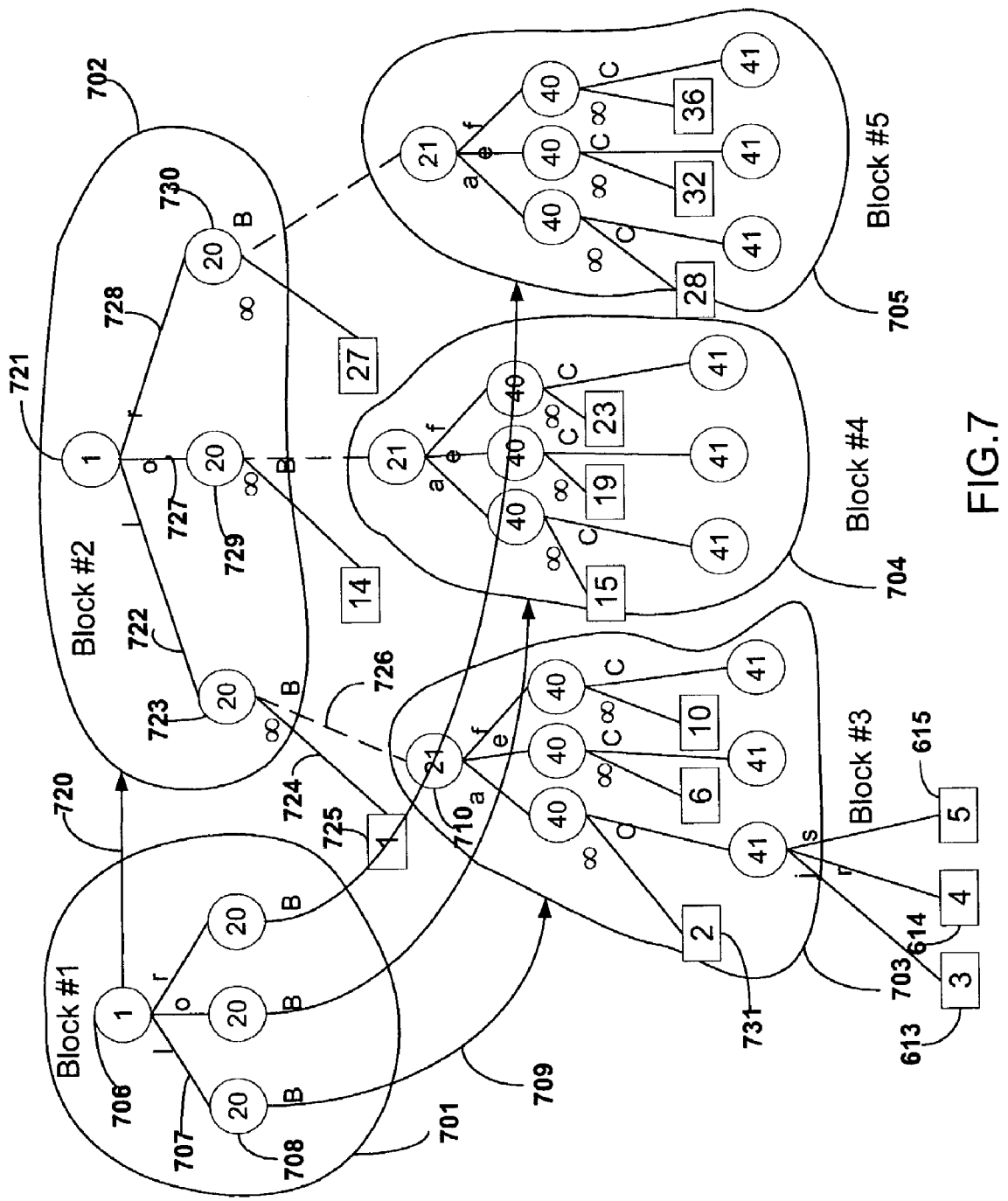
FIG. 7 illustrates a Layered Index over a set of strings.
Figure 7A:
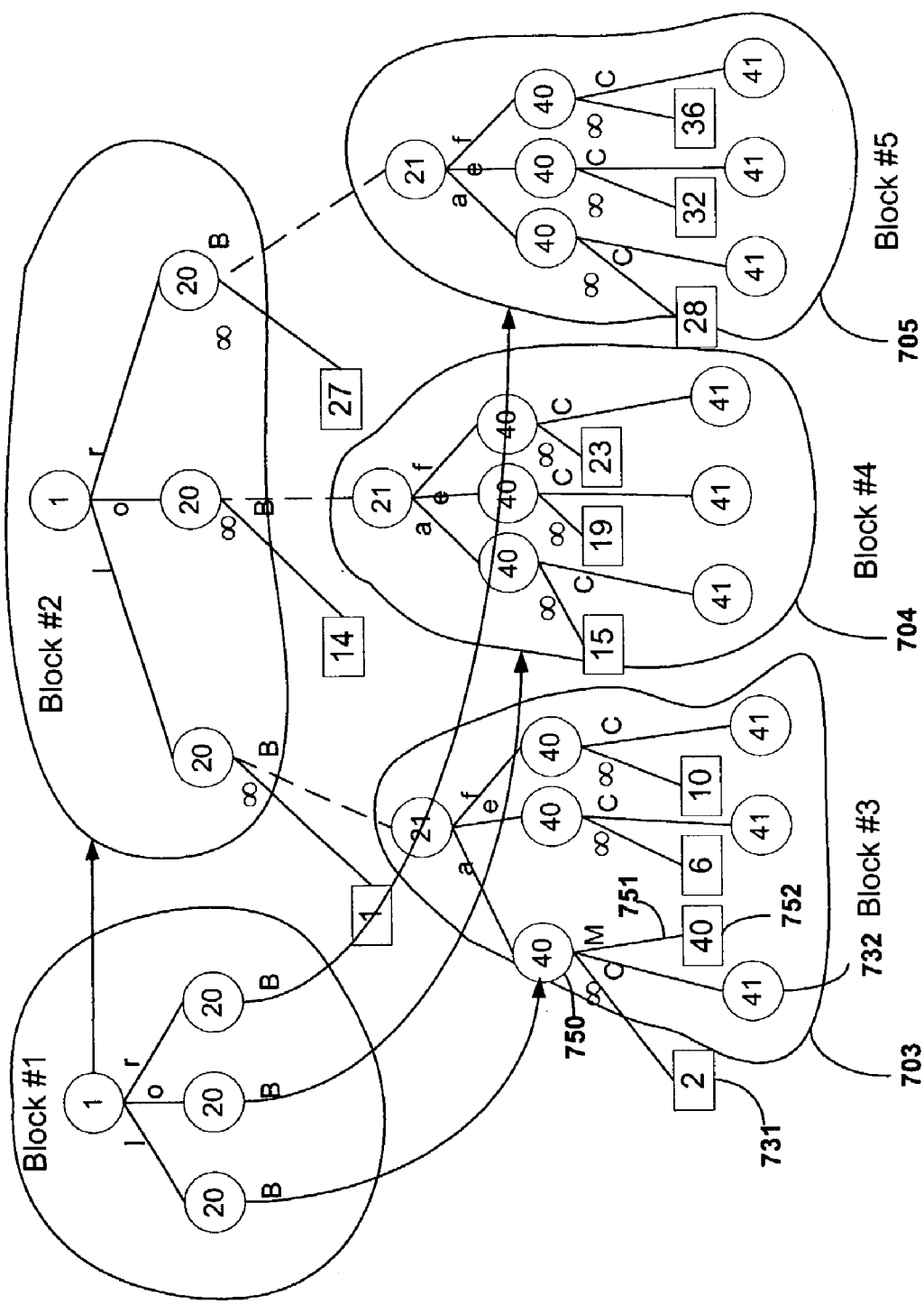
FIG. 7A illustrates a Layered Index over a set of strings with multiple types (of data) at a particular level.
Figure 7B:
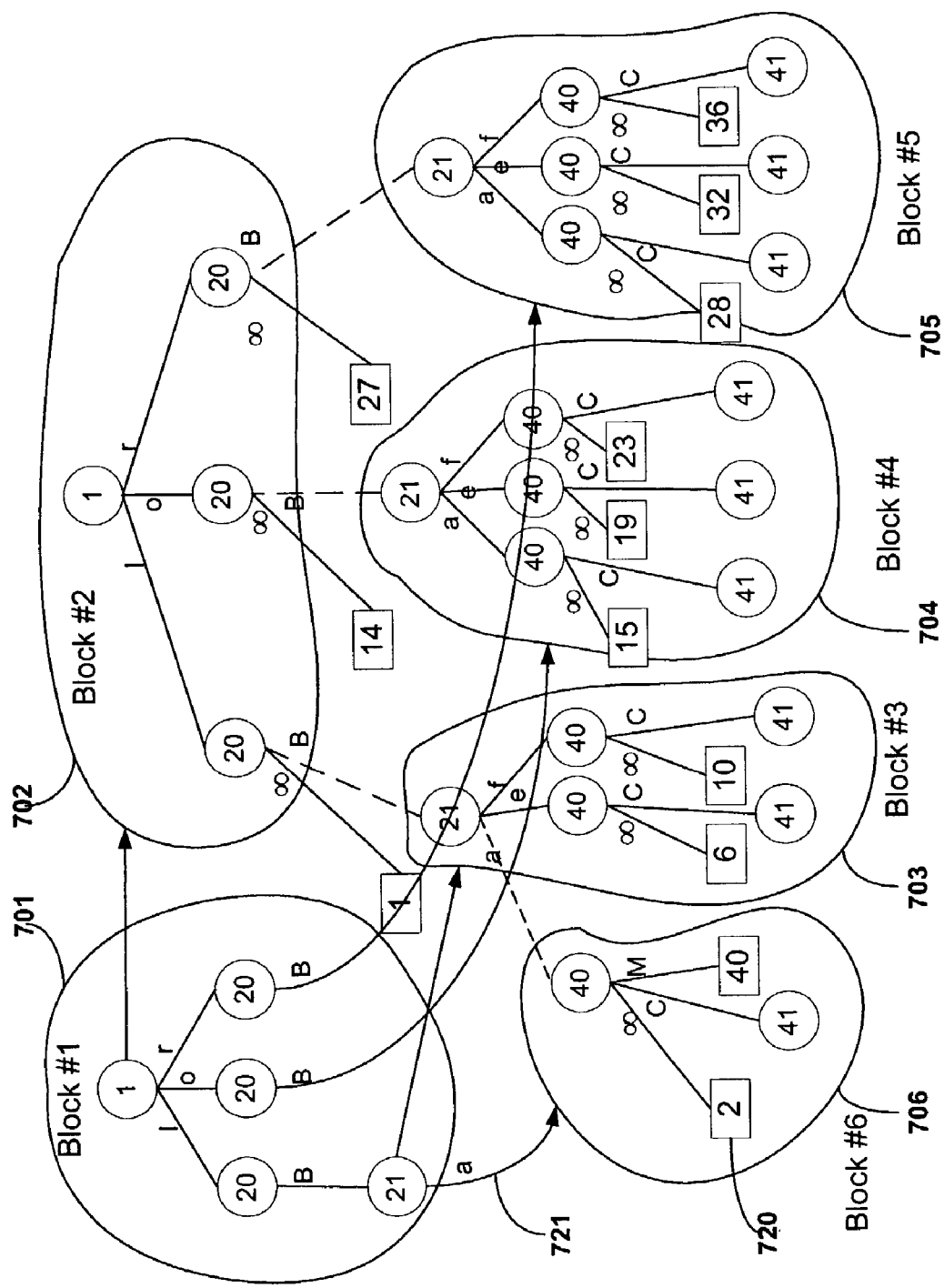
FIG. 7B illustrates a Layered Index over a set of strings with an unbalanced leaf layer.

As was further shown in the Semi-Structured Publication, a semi-structured data (such as the invoice data of FIG. 1 of the Semi-Structured Publication) can be described hierarchically using designators and the subordination relationship (such as the structure of FIG. 7 of the Semi-Structured Publication).

Thus, it is stated on page 11 [0199] of the Semi-Structured Publication:

"The usage of designated data and subordination relationships for semi-structured data can be exemplified by a) using a set of rules and/or knowledge and/or formula to map the semi-structured data to designated data records where each such designated record can be a subordinated record; b) combining the designated records into strings that can represent structural and non-structural information that is either explicit or not explicit in the original data item; and c) creating a designated index in which part or all of each string is treated as a key, thereby enabling search over this set of designated records. In a preferred embodiment such index would be a layered index. The designated records being an example of data items."

Note that an index such as B-tree organizes the keys by their lexicographical order. It does not consider hierarchical organization. For example, consider the keys "AAA" and "BBB". If the key "AAA" has hierarchically related key "AAA111" ("AAA111" is prefixed by the key "AAA" and is considered a child of "AAA", "AAA111" can also be described as subordinated to "AAA"), The B-tree index would organize the keys sequentially as—"AAA", "AAA111", "BBB". A query for all the parent data would be performed by scanning the complete index due to the lack of differentiation between a parent and a child within the index. In this example, the traversal would include the child key "AAA111" hence there is no way for the traversal mechanism to know that the next key after the key "AAA" is a child.

An index such as a trie is more sensitive to the hierarchical nature of the indexed elements. A query for the parent data can use the trie nodes to traverse the trie only to the depth that addresses a parent skipping over sub-trees that address keys of children data. Indexing the above keys using a trie, if the trie nodes represent byte offsets, a trie-based index can conceptually (and practically) ignore sub-trees rooted from nodes with the value 3 (or higher), (assuming position 0 for the first byte of the key and that the key of the child starts as position 3).

Similar to a B-tree structure, also trie maintains the lexicographical order of the keys. However, a trie structure is not balanced and thus usually fails to efficiently support large and disk based data sets.

The semi-structured data does not have a strict schema and does not have to conform to a known format. This made the semi-structured data hard to maintain, search, and index. The need to handle semi-structured data was linked to SGML (Standard Generalized Markup Language) to form a way to describe the semi-structured data. SGML (and the industry specific subsets such as XML, HTML, CML etc.) describes the semi-structured data as a set of hierarchical parent child relationships whereas each element in the set is attached with a tag that encapsulates structural and description of the data element. This resulted in a hierarchical description of the semi-structured data whereas each data element in a data set has a parent except the first one.

Describing the data as sets of hierarchies does not solve the problem of efficient search. In order to allow efficient search, index structures are build to address the different data elements in the hierarchies. The most (or one of the most) commonly used index structure in today's DBMSs is a Btree index. The original incarnation of Btrees allowed for pointers to data at any level of the tree. This was very problematic for range queries because it meant that every level of the Btree, not just the leaves, had to be searched when looking for a range of data. This was a problem in terms of both search performance and search complexity.

Figure 1:
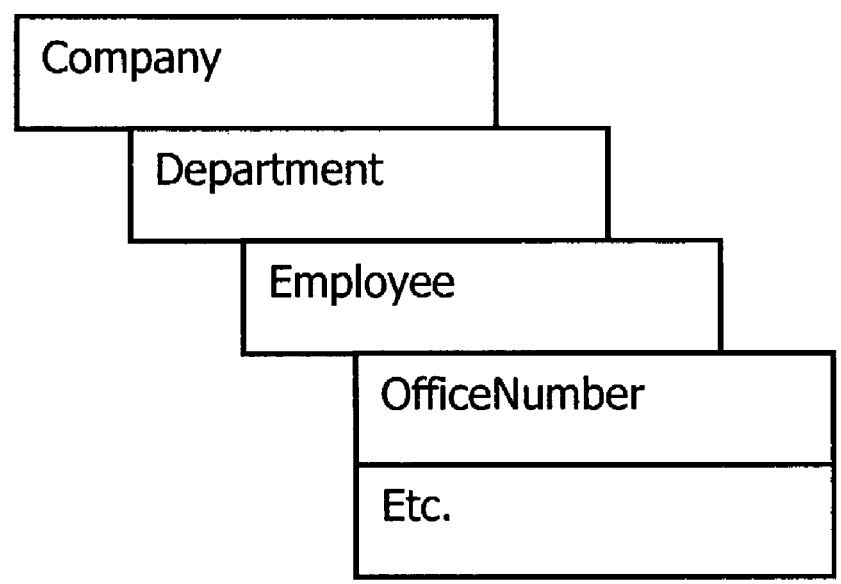
FIG. 1 illustrates semi-structured data organized hierarchically.

FIG. 1 demonstrates semi-structured data organized hierarchically to encapsulate the parent-child relationship. Its hierarchical structure maintains four layers, as seen in FIG. 1. In this data, there are "companies" which have "departments" which have "employees" and so on. The hierarchical structure of the example of FIG. 1 demonstrates subordination between the different data elements: "departments are subordinated to companies," "employees are subordinated to departments," and so on.

Figure 2:
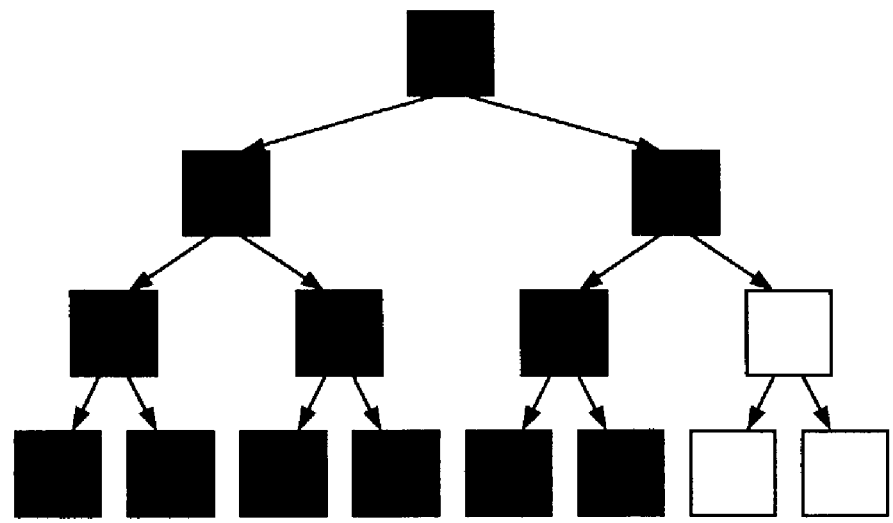
FIG. 2 illustrates a Btree blocks examined, according to the prior art.

To find a range of data items in a regular Btree requires that a large portion of the index (sometimes all of the index) be examined. For example, consider the following SQL-like query:

SELECT department WHERE company='rightorder';

This query finds all departments that belong to the company "rightorder". Assuming a standard Btree, FIG. 2 shows which blocks may be examined. Many of the internal blocks must be examined because a department may appear at any level of the Btree.

Figure 3:
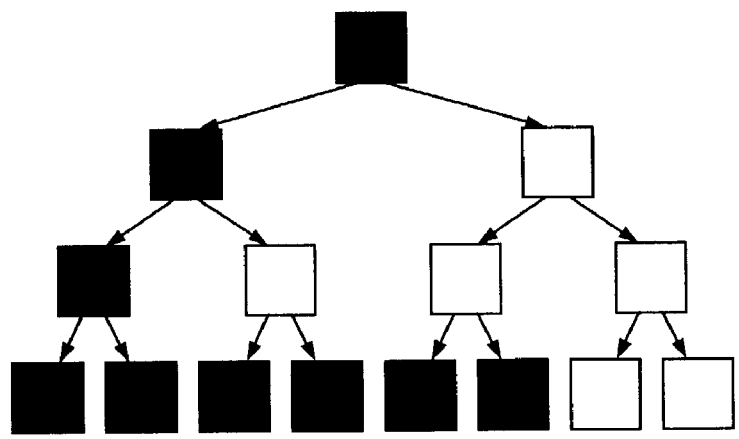
FIG. 3 illustrates a B+tree blocks examined, according to the prior art.

The original Btree was not always efficient in terms of storage because of the data pointers that appeared near the root, and searching the Btree was a non-trivial process. To alleviate these difficulties, a new index was proposed, the B+tree (pronounced "bee plus tree"). A B+tree is the same as a Btree, but there is the restriction that pointers to data can only appear in the leaves. This has two advantages. First, search in the index is straightforward since all data pointers are in the leaves. The second advantage is that potentially fewer blocks have to be examined during a range query. FIG. 2 represents the Btree blocks examined when performing the query mentioned above. FIG. 3 represents the blocks that the B+tree would examine for the same query.

FIG. 3 (B+tree) represents a smaller set of blocks than FIG. 2 (Btree), but a set size that is still far from ideal. The B+tree leaf blocks contain many types of data in addition to the "company" and "department" that are interesting to the query. The leaves also contain data such as "employees", "office numbers", etc. This data is not relevant to the range query of departments of a particular company ('rightorder'), but a remains interspersed with query results, and thus increases the number of blocks required to answer the query.

It should be noted that a typical B+tree (as exemplified above) is built over uniform data. This is a simplifying assumption that makes it simple to maintain the B+tree, but has a significant impact on performance with certain queries.

Since a typical B+tree treats all of the data indexed in a uniform manner, the data is not clustered based on its type; it is only ordered based on value. This is a feature that confers to queries of this type an advantage when run using the Layered Index instead of a B+tree. This advantage will be further shown below.

The Layered Index is described in U.S. Pat. No. 6,175,835 B1 whose content in its entirety is incorporated here by reference. With the Layered Index there is a further improvement beyond that of the B+tree. A Layered Index can maintain a Patricia-based leaf layer that is similar to the original Btree. An explanation of the Patricia structure can be found at Donald Knuth, The Art of Computer Programming, Vol. III, Sorting and Searching, Third Edition, pages 490-493, 497-499, 501-504 and the Patricia implementation is referenced on column 10 line 5 of the above U.S. Pat. No. 6,175,835 B1 patent The general search approach of the Layered Index (by a particular key) can be described as a search using an index arranged in blocks, each block of said index contains at least compressed information identifying the keys accessible from such block and links such that data records can be found according to their key. The process includes reading a series of blocks composed of a root block and additional 0 or more blocks and 0 or more data records addressed by a leaf block from the said series of blocks. The link to each additional block in the series or to the data record is found by applying a formula based on the compressed information in each previously read block and the key of the searched data record. Since the information in each block can be sparse, a wrong data record might be accessed. Thus, when a data record is read, it is possible to decide that the searched data record does not exist or to initiate a new search by adding the information found in the accessed data record to the search formula. This last step of initiating a new search is repeated until the data record is found or it is possible to decide that the searched data record does not exist. A general explanation of the Layered Index is provided in the above U.S. Pat. No. 6,175,835 B1 e.g. from line 23 of column 8 to line 57 of column 13. With the Layered Index, pointers to data elements appear throughout the blocks in the leaf layer. This would be a disadvantage, in terms of search efficiency, except that getting to a block in the Btree-like leaf layer is done in a B+tree fashion thus for a Layered Index the pointers to data appear at the leaf layer.

The horizontal layers of the Layered Index capture all the advantages of the B+tree in terms of navigation and space efficiency: pointers to data appear only in the leaf layer of the Layered Index. However, the leaf layer of the Layered Index is itself a tree.

This hybrid approach leaves the Layered Index with the best of both worlds. As explained and exemplified in the U.S. Pat. No. 6,175,835 B1 patent (for example from line 49 of Col. 8 to line 64 of the same Col.), searching for keys is balanced and simple. Once at the leaf layer of the Layered Index, the Btree properties that are performance killers in a non-layered index prove to be an advantage for range queries.

In a particular embodiment of the Layered Index, the leaf layer of the index maintains a tree structure over the keys of data records. Said leaf layer is based on a Patricia trie. For each parent element, links to its children elements appear in a sub-tree in the leaf layer, the root of the sub-tree includes a link to the parent. The search by a particular key in the index is performed in a balanced manner by traversing to the relevant block in the leaf layer using the non-leafs layers (rather than the trie of the leaf layer).

As explained in U.S. Pat. No. 6,175,835 B1, for example, from line 4 of column 10 to line 37 of the same column, some search traversals can result with an error, which is followed by a process to fix the search error. However, these errors are relatively rare and do not affect the overall performance and efficiency of the search and update processes. Because of a mistake, a particular search (or update) can be more expensive than a mistake free search (or update), however these mistakes are distributed among the search (and update) keys regardless of their hierarchy having a similar effect on the average efficiency of the search (and update) of keys in each level of hierarchy. Thus, with the Layered Index (as will be demonstrated in the examples to follow), the index maintains both—the hierarchical nature of the information (as children are subordinated to parents) in the trie of the leaf layer with the ability to access any data element (a parent or a child) in the same level of efficiency (i.e. with the same number of I/Os).

Note that the Layered Index is a self-organizing index. This means that related elements tend to be stored in the same region. Similar objects tend to be clustered together in the leaf layer of the index. What is needed is a process that allows the search for related items efficiently. This can be a significant advantage for range queries, without adversely affecting point ("rifle-shot") queries. With the query from above:

SELECT department WHERE company='rightorder';

This query finds all departments that belong to the company "rightorder". For this query over a regular Btree, FIG. 2 showed 12 blocks examined (blocks with black background). For this query and a B+tree, FIG. 3 showed 9 blocks examined (blocks with black background). The blocks that would need to be examined in the Layered Index are the 3 shown in FIG. 4.

Figure 4:
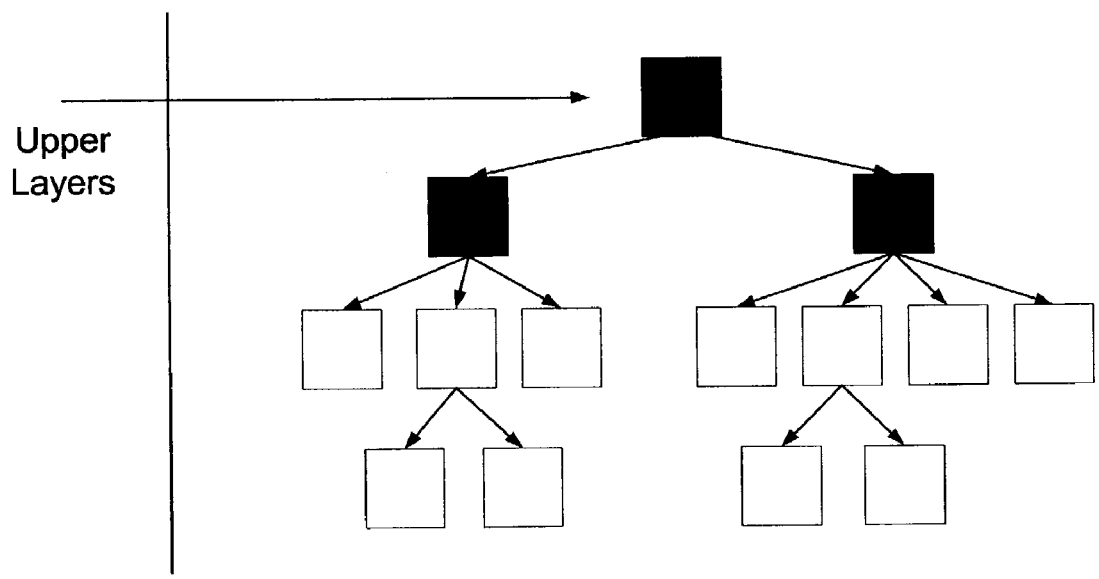
FIG. 4 illustrates a Layered Index, leaf layer blocks examined.

The index of FIG. 4 is the leaf layer of a Layered Index (squares represent the index blocks). As explained in U.S. Pat. No. 6,175,835 B1, the non-leaf layers (not shown explicitly, marked in the drawing as Upper Layers) allow efficient navigation to the relevant block in the leaf layer (in this example by the key of 'rightorder'). Once the leaf block is found (the search using the non-leaf layers is balanced compensating for the long paths and the unbalanced nature of the leaf layer—in the example of FIG. 4, the depth of the leaf layer is sometimes 3 and sometimes 4), and since the leaf layer maintains a trie, the search advances depth first post order on a sub-trie rooted in the leaf layer block. Thus, in order to examine the relevant blocks (the black blocks of FIG. 4) and avoid examining information different than departments, the search rule is modified to examine only nodes with values representing key positions of the searched data. In the above example if the size of the key of Company is 10 bytes and the size of the key of Department is 15 bytes, the search procedure is modified to examine only the nodes representing the first 25 bytes of the key. Since the nodes in the depth search appear in incriminating order, whenever the search reaches a node representing a key position beyond the 25 bytes, the search ignores the sub-tree that is rooted from that node.

Thus the Layered Index maintains a balanced structure of blocks, the organization of the leaf layer blocks and their internal representation in a particular implementation is such that if the key of record A is the prefix of the key of record B, the link to record A appears in the root of a sub-tree that includes a link to record B. In a different implementation the link to record A can be found from the root of a sub-tree that includes a link to record B.

The following is a more detailed description of a search process to retrieve XML and/or hierarchical data indexed by a Layered Index. Each layer is an index over the representative keys of the next lower level of the index; layer n is an index over layer n−1; the leaf layer (layer 0) is an index over the keys of the data records. In this example, each layer is based on a sparse trie. A definition of representative keys is available e.g. at the paragraph on lines 23-67 of Col. 8 of the U.S. Pat. No. 6,175,835 B1.

Figure 5:
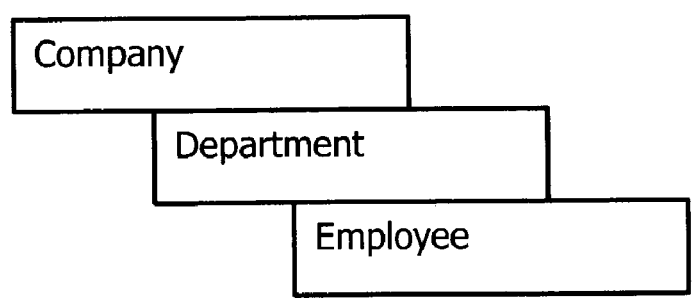
FIG. 5 illustrates a sample hierarchy.

Assuming a hierarchy similar to that seen in FIG. 1, attention is drawn to FIG. 5 showing what the sample data looks like. There are companies, departments subordinated to companies, and employees subordinated to departments. In the example data set, there are three companies: "rightorder", "order", and "leftorder". Each company has three departments: "accounting", "engineering", and "finance". Finally, each department has exactly three employees named "jane", "robert", and "sally".

This data is semi-structured, as it's structure is not known in advance. Additional elements can appear in any place in the hierarchy. One way to describe a particular source data is by using XML notations to be:

```
<Companies>
    <Company>
        <Name>leftorder</Name>
        <Department>
            <Name>accounting</Name>
            <Employee>
                <Name>jane</Name>
                <Name>robert</Name>
                <Name>sally</Name>
            </Employee>
        </Department>
        <Department>
            <Name>engineering</Name>
            <Employee>
                <Name>jane</Name>
                <Name>robert</Name>
                <Name>sally</Name>
            </Employee>
        </Department>
        <Department>
            <Name>finance</Name>
            <Employee>
                <Name>jane</Name>
                <Name>robert</Name>
                <Name>sally</Name>
            </Employee>
        </Department>
    </Company>
    <Company>
        <Name>order</Name>
        <Department>
            <Name>accounting</Name>
            <Employee>
                <Name>jane</Name>
                <Name>robert</Name>
                <Name>sally</Name>
            </Employee>
        </Department>
        <Department>
            <Name>engineering</Name>
            <Employee>
                <Name>jane</Name>
                <Name>robert</Name>
                <Name>sally</Name>
            </Employee>
        </Department>
        <Department>
            <Name>finance</Name>
            <Employee>
                <Name>jane</Name>
                <Name>robert</Name>
```

-continued

```
                <Name>sally</Name>
            </Employee>
        </Department>
    </Company>
    <Company>
        <Name>rightorder</Name>
        <Department>
            <Name>accounting</Name>
            <Employee>
                <Name>jane</Name>
                <Name>robert</Name>
                <Name>sally</Name>
            </Employee>
        </Department>
        <Department>
            <Name>engineering</Name>
            <Employee>
                <Name>jane</Name>
                <Name>robert</Name>
                <Name>sally</Name>
            </Employee>
        </Department>
        <Department>
            <Name>finance</Name>
            <Employee>
                <Name>jane</Name>
                <Name>robert</Name>
                <Name>sally</Name>
            </Employee>
        </Department>
    </Company>
</Companies>
```

This XML/hierarchical information can be represented with the following 39 strings (in sorted order, the number to the left of each string is not part of the string and is for convenience only):

| # | | | |
|---|---|---|---|
| 1. | leftorder | | |
| 2. | leftorder | accounting | |
| 3. | leftorder | accounting | jane |
| 4. | leftorder | accounting | robert |
| 5. | leftorder | accounting | sally |
| 6. | leftorder | engineering | |
| 7. | leftorder | engineering | jane |
| 8. | leftorder | engineering | robert |
| 9. | leftorder | engineering | sally |
| 10. | leftorder | finance | |
| 11. | leftorder | finance | jane |
| 12. | leftorder | finance | robert |
| 13. | leftorder | finance | sally |
| 14. | order | | |
| 15. | order | accounting | |
| 16. | order | accounting | jane |
| 17. | order | accounting | robert |
| 18. | order | accounting | sally |
| 19. | order | engineering | |
| 20. | order | engineering | jane |
| 21. | order | engineering | robert |
| 22. | order | engineering | sally |
| 23. | order | finance | |
| 24. | order | finance | jane |
| 25. | order | finance | robert |
| 26. | order | finance | sally |
| 27. | rightorder | | |
| 28. | rightorder | accounting | |
| 29. | rightorder | accounting | jane |
| 30. | rightorder | accounting | robert |
| 31. | rightorder | accounting | sally |
| 32. | rightorder | engineering | |
| 33. | rightorder | engineering | jane |
| 34. | rightorder | engineering | robert |
| 35. | rightorder | engineering | sally |
| 36. | rightorder | finance | | |

| | | |
|---|---|---|
| 37. rightorder | finance | jane |
| 38. rightorder | finance | robert |
| 39. rightorder | finance | sally |

Designators to the different record types are defined such that companies are designated with a string of bits equivalent to the character A, departments with the string of bits equivalent to the character B and employees with the string of bits equivalent to the character C. The hierarchical nature of the data and parent child relationships are treated as subordination of data records. For example, the record whose key is #2 "leftorder accounting" is considered subordinated to the record whose key is #1 "leftorder". A description of designators and subordination of data records can be found, e.g. in U.S. Pat. No. 6,175,835 B1 from line 1 of Col. 14 to line 19 of Col. 15. An index over the designated strings is called a designated index. The procedure to map the XML data to designated strings is exemplified throughout the Semi-Structured Publication and for example with reference to FIGS. 7 and 8 of the Semi-Structured Publication.

Figure 6:
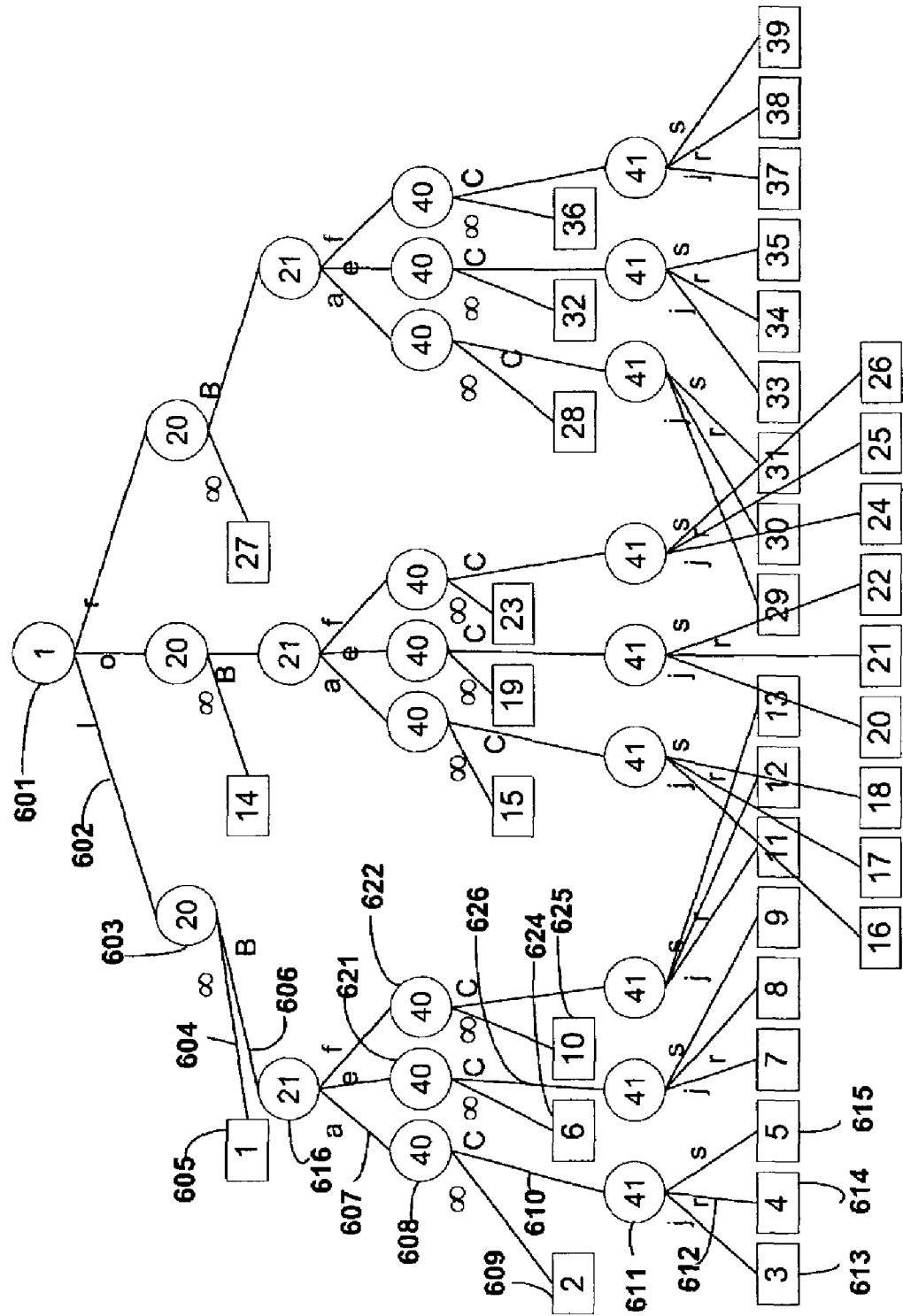
FIG. 6 illustrates a sparse trie over a set of strings.

FIG. 6 shows a sparse trie over the set of the 39 strings. The circles represent the nodes of the trie whereas the number in each node corresponds to the node's value. In this particular example, the trie differentiate between keys by 8 bits values, thus each link from each node is assigned with an 8-bits label that corresponds to the value of the key at the position addressed by the node. (The trie can be based on any number of bits, for example 1 bit implementation, 4 bits implementation etc, or combinations, for example some portions are based on 1 bit at some other portions on 4 bits. In addition, the trie can include additional information. For example the root node in each block can include the representative key of the block). The squares represent the different keys and the value in each correlates to a string from the above list of 1-39 keys.

In order to simplify the example, it is assumed that the key including the designator in each level is 20 bytes long and that a null value is appended to the end of each string and forms part of the key.

For example, the key #4—"leftorder . . . accounting . . . robert" is designated to be "Aleftorder . . . Baccounting . . . Crobert". The designator "A" is considered to be in position 0 of the key string; "B" and "C" are in positions 20 and 40 respectively. In addition, the last character of the key string (position 60) is Null. In order to search in the trie for key #4 (614 in FIG. 6), the link labeled "1" (602) is followed from the root node (601) (the root node differentiates between "Aleftorder", "Aorder" and "Arightorder" at position 1 of the key), the link labeled "B" (606) from the node with the value 20 (603) (the node differentiates between the designator "B" for departments and the null value (604) at the end of the key "Aleftorder "(605)). Then, we follow the "a" labeled link (607) (since the department of key #4 is accounting and thus "a" appears in position 21) to reach a node with a value 40 (608) that differentiates between the key "Aleftorder . . . Baccounting"+Null (key #2) (609) and the key "Aleftorder . . . Baccounting . . . C" that prefix the keys # 3, 4 and 5 (613, 614, 615 respectively). Now, we follow the link labeled "C" (610) (hence "C" is a designator at position 40 of the search key) to the node with the value 41 (611). The node with value 41 differentiates between the different employees of the accounting department thus we need to follow the link labeled "r" (612) (the "r" of "robert" at position 41) to reach the key #4 (614).

Although tries, such as the trie of FIG. 6, are not usually used as disk based structures, the following discussion points to some of their properties and techniques that are advantageous insofar as Layered Index is concerned:

a) Trie maintains the lexicographical order of the keys, for example, a search for all the information of a particular company such as "leftorder", would retrieve the data by the order of the key. The search would use the designated key "Alftorder . . . " to find the sub-tree with the relevant information. The search starts at the root node of the tree (601) and reach node 603 using the link labeled "1". Then a traversal (using depth first post order) from node 603 (over the sub-tree rooted there) would retrieve the keys by their lexicographical order: The search would follow node 603 to data #1 (605), node 603 to node 616, node 616 to node 608 using the link labeled "a" (607) to retrieve the accounting information: node 608 to data #2 (609), node 608 to node 611, node 611 to data #3, #4, #5 (613,614,615 respectively. The order is determined by the value (label) of the link to the data). The search backtracks to node 616 and in a similar manner uses the link labeled "e" to retrieve the engineering department information—data #6, #7, #8 and #9. The search continues by backtracking again to node 616 to use the link labeled "f" to retrieve the finance department information—data #10, #11, #12 and #13. Thus, the index traversal retrieved the data by the order of the keys.

b) It is possible to traverse the same index tree differently to satisfy a query for particular elements of an indexed data set. For example, a query for only the departments' information of the company "leftorder" (ignoring the employees' information) would "skip over"/ignore the sub-trees (rooted at nodes 608, 621 and 622) over the designated children (in this particular example the immediate children are designated "C" thus the link labeled "C" is ignored) and would retrieve the different departments (using the links designated null (marked ∞) to the department information). This traversal would be of the form: node 601, node 603, data #1 (605), node 616, node 608, data #2 (609), (backtrack to) node 616, node 621, data #6 (624), (backtrack to) node 616, node 622, data #10 (625).

A query to only the departments of "leftorder" and the employee information of only the "engineering" department would add a traversal from node 621 using the link labeled "C" (626) to and over the sub-tree of the employees of the engineering department (thus retrieving the employees #7, #8 and #9). The common practice to satisfy such queries, and in particular with the Btrees (or B+Trees) indexes, would be to scan all the keys that are prefixed by the search key and filter out the irrelevant information. Skipping over the sub-trees (as demonstrated above) has a significant advantage (in terms of efficiency/performance) especially when these skipped portions represent large sets of information.

If more data is add to the trie of FIG. 6, the size of the trie would increase to be too big to fit into the internal memory of a given computer system. In addition the trie can become unbalanced. For example adding a new key such as:

"Aleftorder . . . . Baccounting . . . Csandra" representing a new employee in the accounting department of leftorder would create a leaf node with a value 43 to differentiate between the new key and key # 5 (615).

As explained in the U.S. Pat. No. 6,175,835 B1, in order to solve these problems, (to allow efficient and balanced access to data), the original trie is partitioned into blocks and a Layered Index is formed.

FIG. 7 shows the trie of FIG. 6 partitioned into blocks. An additional index layer (the trie in block #1 (701)) over the representative keys of the blocks of the original (leaf layer) trie (blocks #2, #3, #4 and #5 (702, 703, 704, and 705 respectively)) allows balance and efficient access to the data records according to their keys (most data records originated from the leaf nodes of the leaf layer trie of FIG. 7 are omitted for convenience).

Using the Layered Index, the search path to record #4 (714) would start at the trie of the root block #1 (701), use the link labeled "1" (707) from the root node (706) to the (leftmost) node labeled 20 (708) and follow the far link labeled "B" (709) to reach Block #3 (703). Once block #3 is available, the search by the key #4 starting at the root node of block #3 (710) would end at the record whose key is #4 (714).

In the same manner, a search by the key #2 "Aleftorder. Baccounting . . . " would follow the path 706, 707, 708, 709 (in block #1 (701)) to block #3 (by examining positions 1 and 20 in the key), and the path from node 710 to key #2 (731) (by examining positions 21 and 40 in the key).

And in a similar manner, the search by the key #1 "Aleftorder . . . " would follow node 706 and link 707 to node 708 in block #1 (701). Since the node 708 has a value of 20 and a link with a null value is not available from this node (null is appended to the key #1 at position 20), the search process backtracks to the direct link 720 to read block #2 (702) and navigate to the key #1 (725) using nodes and links 721, 722, 723 and 724.

An important feature of the invention was demonstrated with reference to FIG. 7, i.e. that with the Layered Index, the search to a particular parent and the search to a particular child are done in similar efficiency—all 3 search processes were done with 2 index I/Os: The search for the keys #4 and #2 accessed blocks 701 and 703, the search for key #1 accessed blocks 701 and 702.

There follows now a more detailed description of an efficient range search:

Thus, the index of FIG. 7 is a Layered Index over keys representing the XML/hierarchical data. With the Layered Index, the non-leaf layers (such as the block #1 of FIG. 7) allow to efficiently find the leaf layer block that maintains the root of the sub-trie that satisfies the range search.(i.e. with a small number of I/Os). Note that in contrast to the efficient search scheme of FIG. 7, finding the root block of the searched sub-trie in a regular trie (i.e. conducting a search in a non balanced trie, such as in FIG. 6) can be very inefficient. The even distribution of the data of the example (3 companies/3 departments per company/3 employees per department) relating FIG. 7, created a leaf layer trie which is 2 levels deep (block #2 (702) as the root and blocks #3,#4,#5 as the leafs (703,704,705 respectively). Additional insertions may easily render the leaf layer trie to be unbalanced. For example, FIG. 7-A shows additional keys represented in block #3 (the data addressed by the leaf nodes of the leaf layer is omitted for convinience). If block #3 splits, it may result in the index of FIG. 7-B where the leaf layer trie is not balanced (either 3 or 2 layers deep). Thus, for example, with FIG. 7-B, the usage of the trie in the leaf layer to retrieve the department "leftorder accounting" (720) requires 3 blocks of the leaf layer rather than 2 (before the split). As explained and demonstrated throughout, the additional layers (block #1 (701) of the example of FIG. 7-B) allows a balance search regardless of the depth of the leaf layer (in the example of FIG. 7-B, the layered index is a balanced structure, 2 levels deep, having a root block #1 (701) and blocks #2, #3, #4, #5 and #6 as the leafs whereas the index maintained by the leaf layer is not balanced—the block #2 as the root, the blocks #3, #4 and #5 are 2 levels deep and the block #6 is 3 levels deep).

Keys representing parents, children and parent-child relationship of the XML/hierarchical data are such that the prefix of the key of the children records is identical to the key of the parent record (omitting the null value at the end of the key of the parent). Thus, for example, the prefix of the key of "Aleftorder . . . Baccounting . . . " is the key of the parent record (Aleftorder . . . "). Searching for the children of "Aleftorder . . . " is possible by searching by the key "Aleftorder . . . " to find the sub-tree that represents the records that include Aleftorder . . . " at their key prefix. As explained above (and now with greater detail with reference to FIG. 7), this search would start at the root node of block #1 (706), continue with the link labeled "1" (707) from the root node ("1" is the key value at position 1), to node 20 (708). The key value of "Aleftorder . . . " at position 20 is null (hence null is appended to the end of each key). Since there is no link labeled null from the node 708, the search would backtrack to use the direct link (720) from the root node of block 1 (706) to block #2 (702). Block #2 is read and the search follows the link labeled "1" (722) from the root node (721) to reach the node with the value 20 (723). Then, record #1 is read (725) by the link labeled null (724) (marked as ∞) to verify the correctness of the search. A general explanation of this procedure can be found in the specified U.S. Pat. No. 6,175,835 B1 (for example from line 4 of column 10 to line 30 of the same column). In this example, whenever a key has subordinate children, a node representing the last character of the key of the parent would differentiate between the children and the parent—the parent key maintains a null value at this position whereas each child maintains a designator with a value other than null. Now, in order to find the children of a specific type, the link with the label that corresponds to the designator value is followed. In the example of FIG. 7, the split link labeled B (726) would allow to find all the departments of "Aleftorder . . . ". If the company would have other related data (not shown in the figure) for example, designated G (Exemplifying "Aleftorder . . . G231 main st." representing the location of the company), and the data needed is location information, a traversal using the link labeled G (from the node 723) would allow to retrieve the location information. Note that, the search by the key "Aleftorder . . . " reached the node 723. The traversal from the node 723 depends on the information needed to satisfy the query: It is possible to retrieve the company information (using link 724), it is possible to traverse to the department information using the link labeled B (726) and it is possible to traverse to other types of subordinated information, for example, location information using link labeled G (not shown in the figure).

FIG. 7 is also used to demonstrate the next examples. The first is a traversal over the entire sub-tree rooted by the node with the value 20 (723) to find all the children of the company 'leftorder') regardless of their type. If only one particular type of children is needed (for example, departments but not office locations), the search is able to navigate to the needed data (such as to use the link labeled "B" (726) from node with the value 20 (723) to find the departments, as departments are designated "B" at position 20 of their key) and is able to ignore links that address data not relevant to the search criteria (such as G (not shown in the drawing), that would appear from node 723 if office locations were indexed in the structure).

The second example is a search procedure to retrieve all the companies (without their children). This query can be described by a pseudo-SQL:

SELECT company WHERE company='*';

And would use the key "A" (being the designator of companies) as the search key. The search would use the direct link (720) from the root node of block #1 (706) to block #2 (702) hence the value of the root node of block #1 (701) relates to a position beyond the search key. Then, the search would follow the links "l" (722) "o" (727) "r" (728) to find the nodes (723, 729, 730) that are linked to the companies and read the data records #1, #14 and #47.

The search traversed the sub-tree rooted by node 721 (using the rule depth first post order) to find all the companies. If the search reach a node representing a position beyond the company key or a position representing the last bits of the key—such as the nodes with the value 20 at block #2 (723, 729, 730), the search is able to retrieve the searched data record (in this example by using the null link) and ignoring afterwards the sub-tree rooted from that node. This process yields the following traversal: 721, 722, 723 to collect the key #1 (Aleftorder), backtracking to the node 721 and using 727 and 729 to collect key #14 (Aorder), backtracking to node 721 and using 728 and 730 to collect key #27 (Arightorder).

The above examples and discussion demonstrated a tree based index, partitioned into blocks, over keys representing hierarchical data (the data set 1-39); keys of the dataset include keys of parent records (such as the key "Aleftorder . . . "); one or more parent records have children such that a key of a child record is prefixed by the key of its parent (for example, departments are prefixed by the key of their company); The index includes a sub-index such that the sub-index is an index over the children keys of a parent (for example, the data indexed by the sub-tree rooted at node 710 index the children of "leftorder").

The index maintains a balanced structure of blocks as navigation to any of the leaf blocks (#2, #3, #4 and #5) by any particular indexed key is through the non-leaf layers (block #1 (701)).

Thus, it is possible to search in the index by a key of the parent. For example searching by the key "Aleftorder" to find the parent 725 (using the non-leaf layer). In addition, it is possible to continue the search for the children of "leftorder" by traversal using the link 726 to the sub-tree (rooted at node 710) to retrieve the children. Or it is possible to backtrack from node 723 to node 721 and then traverse to node 729 to retrieve the next parent #14 (rather than retrieving the children).

In this example, in order to physically cluster the links to the companies (and thus being able to retrieve the companies with minimal I/Os), the preferred split positions were those who disconnected a parent from his children rather than positions that disconnected a parent including his children. For example, the split link 726 disconnected the parent "leftorder" (725) from his children (such as "accounting" (731)).

Figure 13:
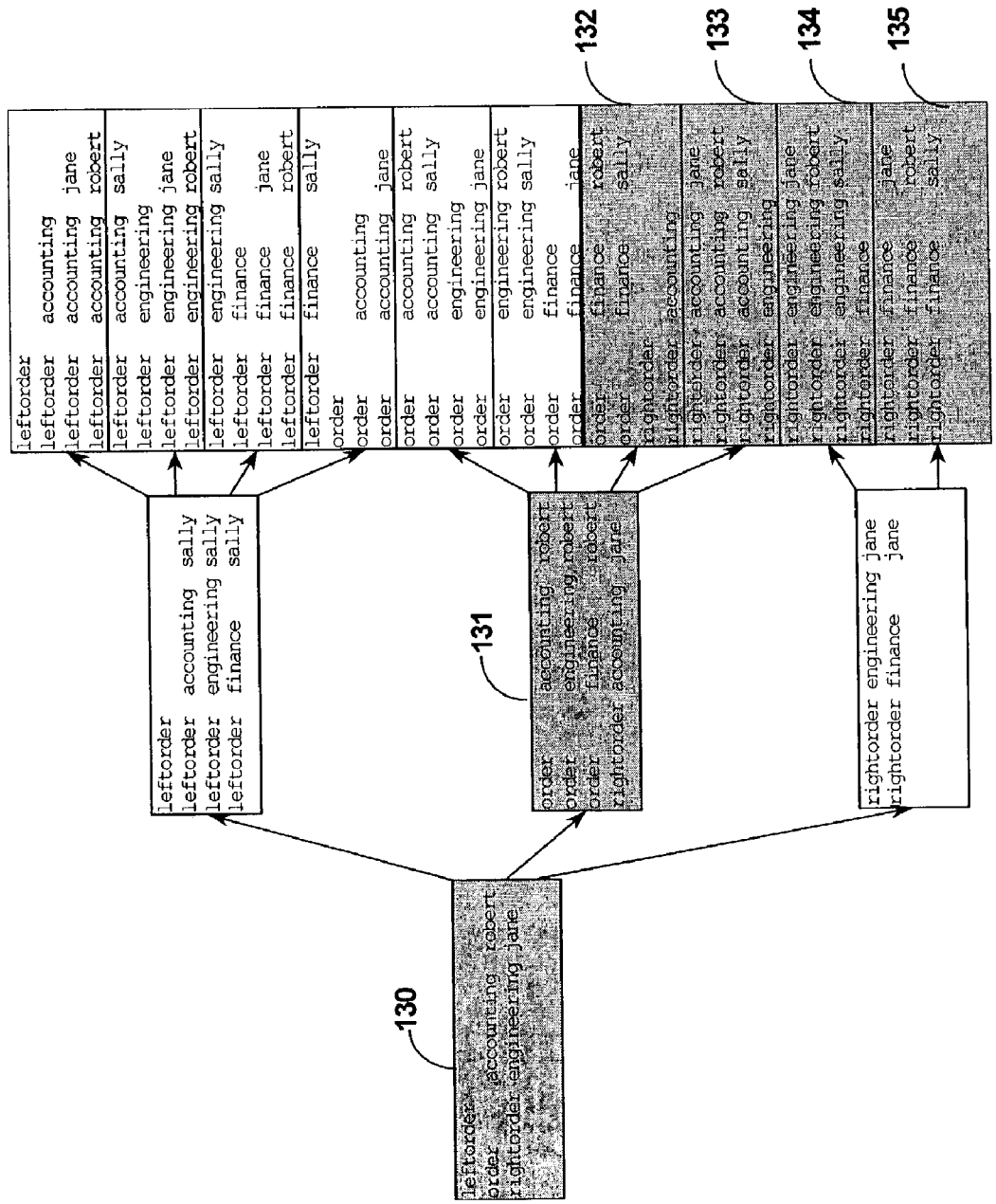
FIG. 13 illustrates Examined blocks in B+tree, according to the prior art.

However, since specific implementations maintain a link to the parent in the data record of the child, it is not needed to physically cluster the link of a parent with that of a child in the index. (A detailed description is available e.g. with reference to FIG. 13E in U.S. Pat. No. 6,175,835 B1. In the particular embodiment described there, every child data record (subordinated data record) maintains a link to its immediate parent).

Alternatively, if the split is between a parent and its children, the link to the parent can be maintained once in the disconnected block (for example, in the header of the block) hence all the data elements addressed by the disconnected block are children (at some level) of that parent. For example a link to the parent "leftorder" (725) can be maintained in the header of the block #3 (703) or attached to the root node 710. A search to a department (such as "accounting" (731)) is able to retrieve the parent ("leftorder" (725)) from the block that address the department (if such link is maintained in the block) even if a split process disconnected the part of the trie that addressed the company (node 723) from the sub-trie that address its children.

Thus, the invention in accordance with one aspect provides for a method for encoding XML and or semi-structured data and/or hierarchical data, such that:

Providing an index (exemplified by the index of FIG. 7), partitioned into blocks, over keys representing semi-structured and/or hierarchical data. Said semi-structured and/or hierarchical data is represented by keys of type $K(i)$ as the parent and for each parent 0 or more children of the type $K(i)+J(1) \ldots K(i)+J(n)$. In the above particular example, the key of an employee is prefixed by company+department and the key of department is prefixed by the key of the company.

The index allows to navigate from the link of $K(i)$ to the link of the sequentially next $K(i+1)$ skipping over the links to $K(i)+J(1) \ldots K(i)+J(n)$. This was demonstrated above by the traversal to the different companies #1, #14 and #27 of FIG. 7, skipping over the subordinated information (such as the department "Aleftorder . . . Baccounting . . . " #2 (731)).

In addition, the said index allows to navigate from the link $K(i)$ to all of its children $J(1) \ldots J(n)$ by the order of the key. As exemplified above by navigating to the subordinated information of the company "leftorder" (725 of FIG. 7). Obviously, the Patricia trie maintained in the blocks of the leaf layer of the Layered Index (blocks #2, #3, #4 and #5), maintains the key order (this trie is similar to the connected trie of FIG. 6 with changes needed to partition the trie into the disk based blocks. For example, the link 606 of FIG. 6 was replaced with the split link 726 of FIG. 7. These changes do not change the properties of the trie).

In the particular example, the splits links (such as link 726) disconnected the block that maintained the link to the parent from the block that maintained the links to the children (for example, the parent key #1 (725) is addressed from the block #2 (702) whereas its children such as the key #2(731) is addressed from block #3 (703)) allowing for the links to the parents to be clustered (meaning that the companies are addressed from small number of blocks and in this example, from a single block #2 (702)). Thus, for every 2 consecutive K keys ($K(i),K(i+1)$), whereas the first $K(i)$ key has children such that the size in the index to represent $K(i)$ and his children is equal or larger than a block, it is possible to partition the index such that $K(i)$ and the next consecutive $K(i+1)$ reside in he same block;

As exemplified, the index of FIG. 7 constitutes a balanced structure of blocks. Maintaining such index allows efficient retrieval of the list of companies hence the links to all the companies are clustered within small number of blocks, yet, the structure allows efficient retrieval of all (or part of) the information with hierarchal subordination to a particular key. For example, all the links to the information subordinated to each company are clustered within a small number of blocks (in the particular example all the links to a company related information are clustered within a single block, such as the block #3 accommodating all the information relating to "Aleftorder . . ."), yet, the index maintains a balanced structure of block such that the access to any data element by any particular key (a parent key or a child key) is done in a relatively similar efficiency (i.e. with the same number of I/Os).

Figure 8:
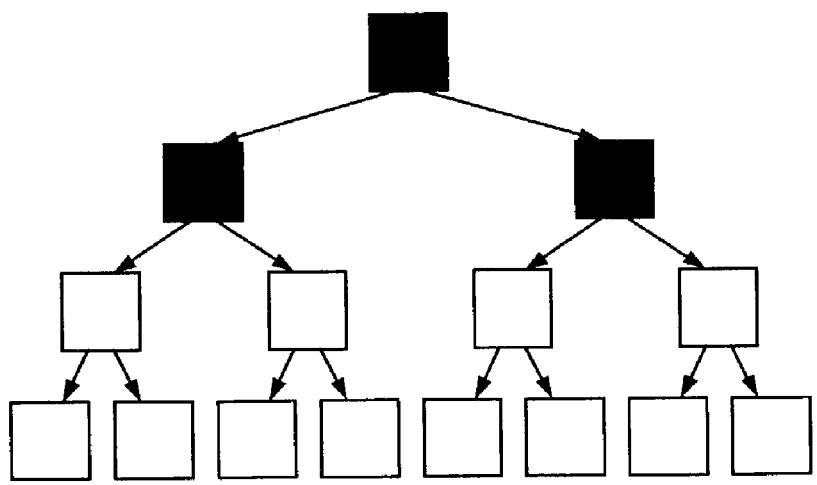
FIG. 8 illustrates an IOT blocks examined.

An alternative approach to the clustering in the Layered Index is the partitioned B-tree, referred to elsewhere as an Index-Organized Table (IOT). IOTs are used for example in Oracle 9i. Additional information on IOTs can be found in: Oracle 9i Index-Organized Tables Technical Whitepaper, September 2001, http://otn.oracle.com/products/oracle9i/pdf/iot_twp.pdf. The IOT has performance characteristics similar to the Layered Index for the range query mentioned above. FIG. 8 shows the blocks examined by an IOT (partitioned B-tree) to answer the query. The number of blocks is roughly the same as the Layered Index. However, this is done with a "cost". The problem with the IOT is that there is no balancing mechanism: data in the root takes far less time to access than data at the leaves.

Note that FIG. 8 does not show the weaknesses of the IOT approach for other query types. While the IOT is good for a simple range query, it does not have the general applicability of the Layered Index. For instance, for very long composite key lookups, as explained in U.S. Pat. No. 6,175,835 B1 (e.g. from line 24 of Col. 35 to line 59 of the same Col.), the structure of the Layered Index is balanced, the root blocks can be maintained in memory with less than 10 MB (for billions of indexed keys regardless of the size of the keys), requiring a single I/O in the leaf layer. An IOT-type structure requires at least one I/O for each component of the composite key. This means that the IOT has some advantage range queries, but can have poor performance for single point lookups ("rifle shot" queries). When a point lookup involves a long composite key, the IOT does at least one I/O per key component, while the Layered Index provides balanced access, regardless of key complexity. Also, in the known per se IOT implementations, only one type of key can exist in each layer, just like a regular relational table. The Layered Index does not suffer this limitation due to the use of designators. As explained and referenced above, designators are strings of bits that are added to the keys. One of the benefits of using designators is that different types of keys of the same level in the hierarchy can be differentiated. For example, a "manager name" that would be added to department (as immediate child/subordinated to department), would be reflected as a new key in the sub-trie that maintains the department information. Using the designator M to identify managers and inserting a key #40 with the value "Aleftorder . . . Baccounting . . . Mbob . . . " to the index of FIG. 7, results in the index of FIG. 7-A. Node 750 of FIG. 7-A (is the root node of the sub-trie that maintains the accounting department information) differentiates between the employee information (designated C and accessed using the link labeled C from node 750) and the manager name that is accessed by the link designated M (751) that leads to the key (or data record) 40 (752). Obviously, if additional managers were updated to that department, their keys would form a sub-tree connected to node 750 by the link 751 (labeled M hence all the managers are designated "M" at position 40 of their key). Even if the managers sub-tree is large and over multiple blocks, the search to each particular manager is efficient (and in a balanced manner) using the non-leaf layers of the index. Finally, in an IOT implementation, long keys cannot be compressed in any fashion similar to the Layered Index, as each key component must be fully represented for search. This makes the IOT potentially very large, compared to the Layered Index.

By utilizing the index layering techniques, access to even IOT structures can be balanced. Before looking at a technique to balance access, the following reviews the imbalance issue with IOTs:

The IOT is a special form of Btree, where the partitioning into layers is based on subordinate fields within the data. The root layer of the IOT represents one portion of a data row, and each subsequent layer represents an addition portion of a data row. This means that particular data fields (a.k.a., "attributes," "columns," etc.) within an IOT will have very different access times. Those near the root of the IOT will be quick to access, while those near the leaves will take much more time.

The Btree does not provide balanced access, but a B+tree does. However, the B+tree is not good for the range query. Using the layering technique, it is possible to combine these two indexes to provide balanced access, and to simultaneously support efficient hierarchical queries.

Figure 9:
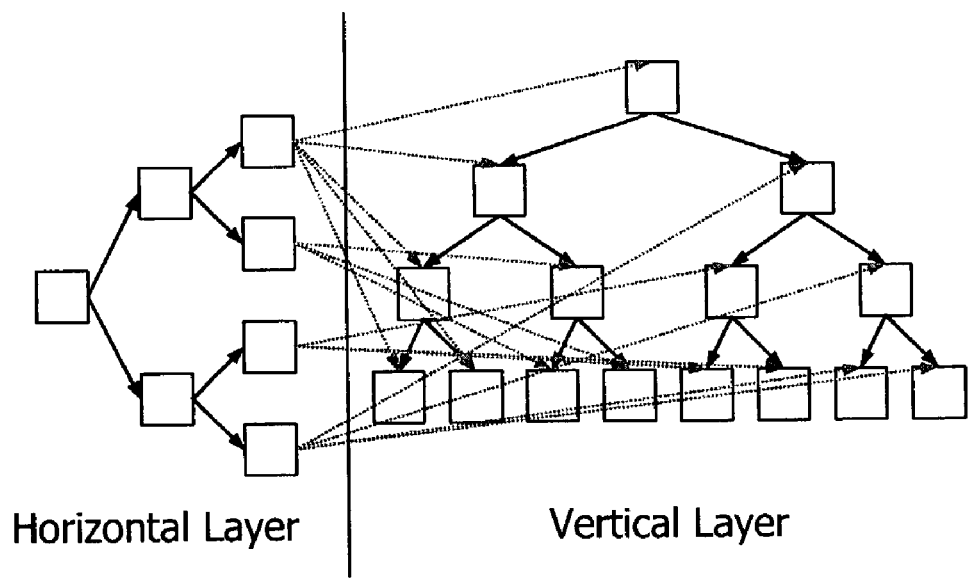
FIG. 9 illustrates an index over partitioned Btree (such as the IOT).

FIG. 9 shows how this balancing act can be performed in accordance with an embodiment of the invention. A partitioned Btree (such as the IOT) is used in the "vertical layer." This structure is unbalanced, but supports hierarchical range queries quite well (in this particular example, the vertical layer seems balanced at first glance since the depth of the tree is always 4. However this stems from the fact that the hierarchical data of this particular example is always 4 levels deep. With additional $5^{th}$ hierarchical data to some of the elements the tree can be sometimes 4 and sometimes 5 levels deep. And, as explained, the structure is also regarded as unbalanced since elements in different levels of the hierarchy are approached by different number of blocks). The B+tree has been used in the "horizontal layer." The B+tree is balanced, but does not have very good performance for hierarchical queries. The combined "Layered Index" performs well for both types of queries.

Note that the preferred implementation of the Layered Index performs the same balancing act by building multiple indexes to provide balance. The vertical layer of the Layered Index is built from a compressed Patricia tree. The horizontal layer is built from a second Patricia tree. If the second Patricia is also imbalanced, another may be built to provide balanced access. This elegant recursion occurs repeatedly until there is a layer that contains a Patricia that fits in a single disk block. A description of this structure can be found in the above U.S. Pat. No. 6,175,835 B1 for example from line 22 of Col. 8 to line 32 of Col. 9.

Figure 10:
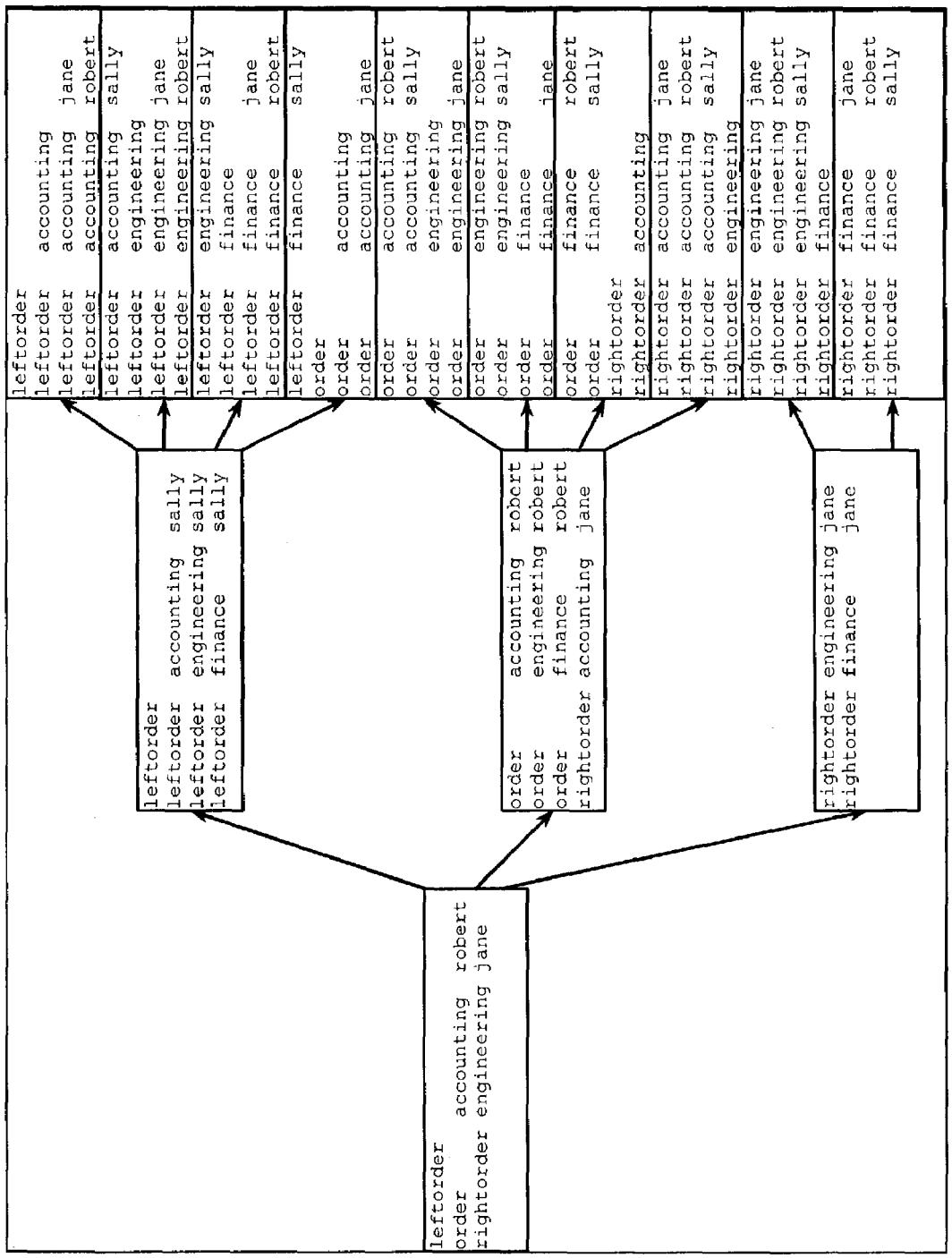
FIG. 10 illustrates data in a B+tree, according to the prior art.

FIG. 8 presented in black the block reads associated with an arbitrary range query. The next examples demonstrate data values divided into blocks. These examples demonstrate the different characteristics of hierarchical range queries within Btrees, B+trees, and using the layered approach. To demonstrate the blocks examined performing a range query with the layered approach, the IOT is presented as an example of the leaf layer, or "vertical layer." The use of the preferred embodiment is the layered Patricia structure (will be presented later in the text). Note that the key strings of the data represented with the hierarchy of FIG. 5 are used:

Thus, FIG. 10 shows how the data strings could appear in a B+tree. The B+tree represents each key in the leaf layer, so all 39 strings appear in the leaf layer exactly once.

Figure 11:
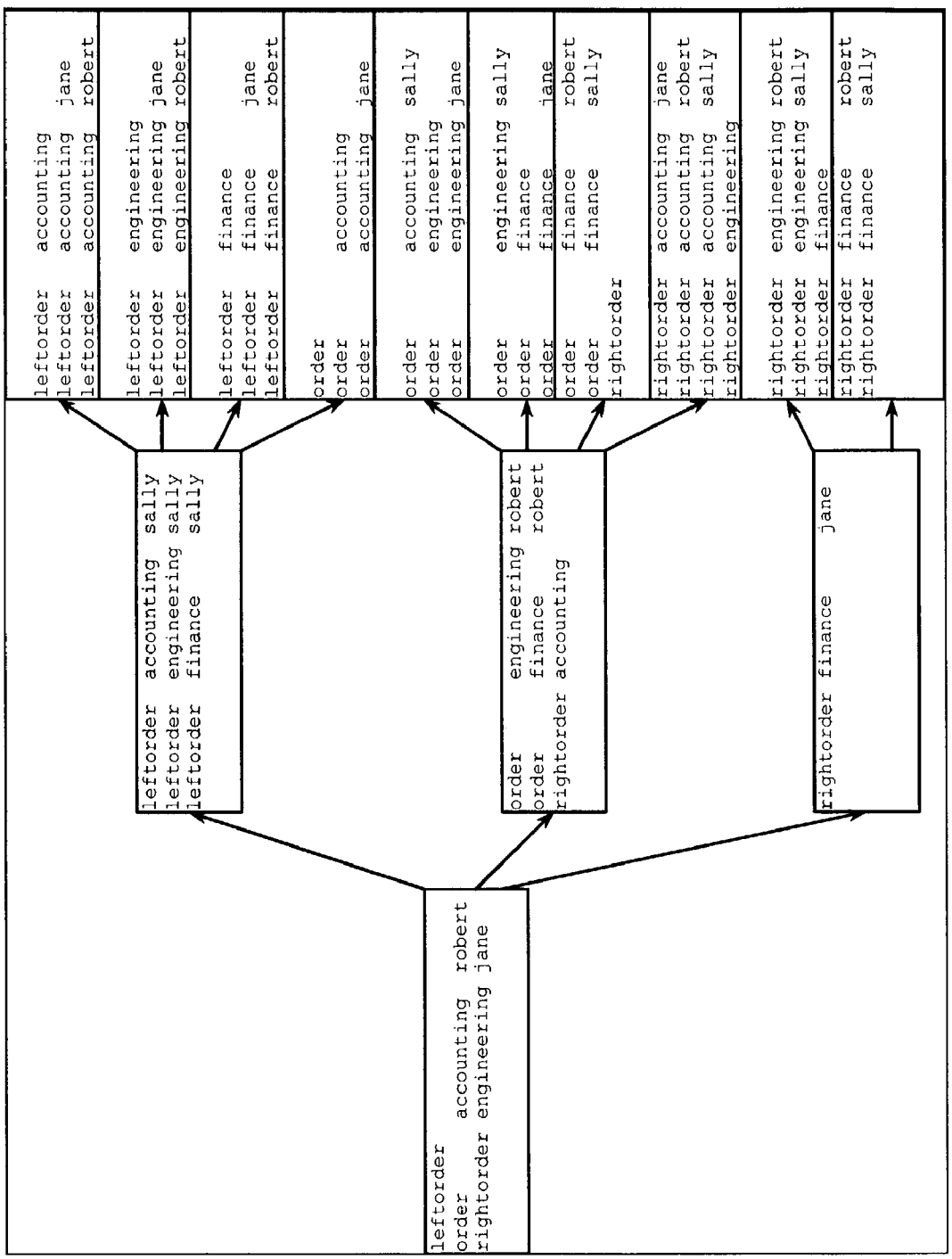
FIG. 11 illustrates data in a Btree, according to the prior art.

FIG. 11 shows how the strings could appear in a Btree. The Btree represents each key exactly once. This means that all 39 strings appear in the index, but all 39 are likely not present in the leaf.

Figure 12:
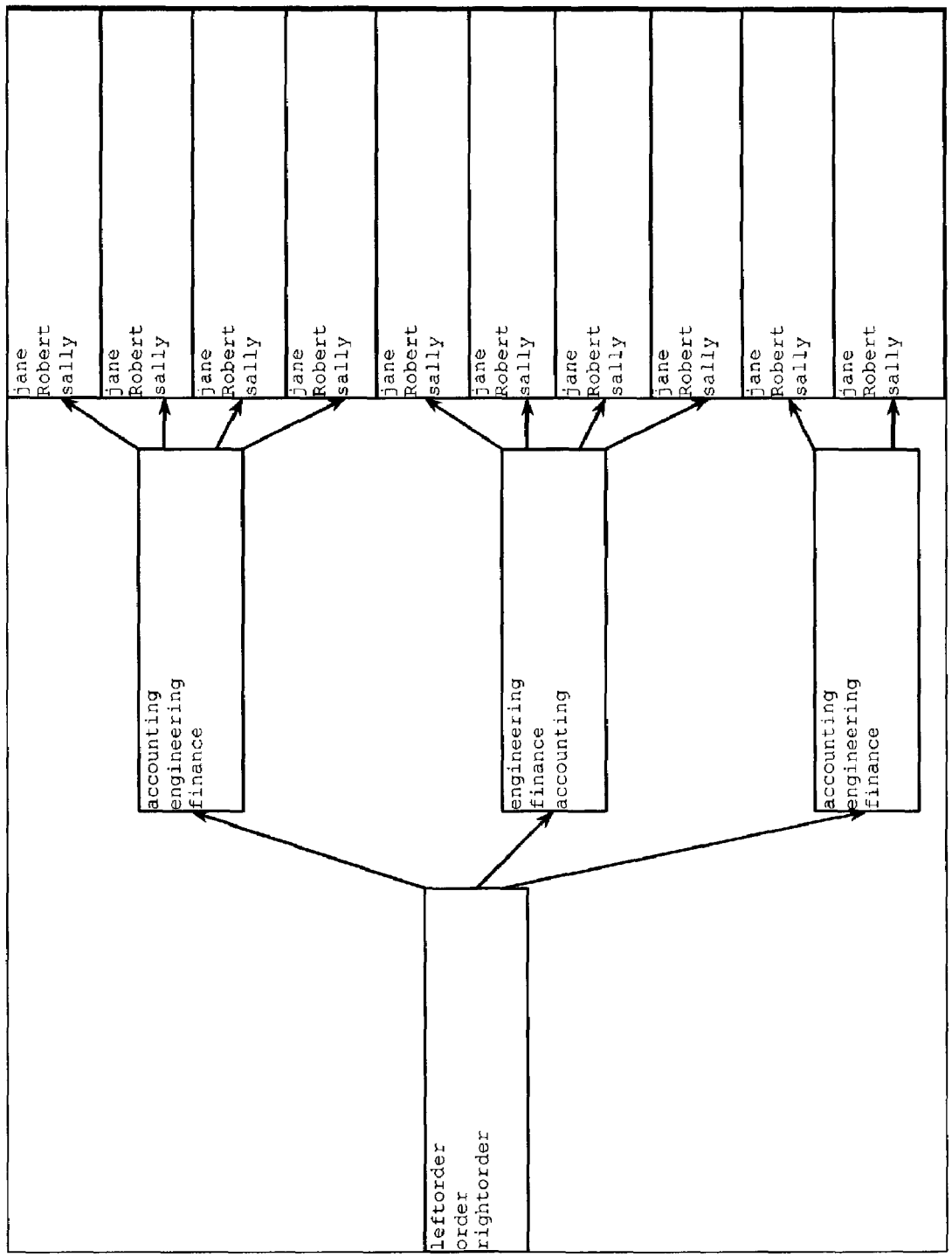
FIG. 12 illustrates data in an IOT.

FIG. 12 shows how the strings could appear in an IOT. Notice that the complete key strings never appear in the index, and that keys are partitioned by type, then sorted by value.

The following demonstrates a range query in the B+tree, the regular Btree, and the IOT. The query in pseudo-SQL is identical to that previously presented:

SELECT department WHERE company='rightorder';

This query finds all departments that belong to the company 'rightorder'.

Assuming the B+tree shown above, FIG. 13 shows which blocks must be examined.

There are six blocks examined. Two internal blocks to get to the right place in the leaf layer (130 and 131), then four blocks scanned in the leaf to get the appropriate data (132-135).

The B+tree is not capable of skipping over blocks with keys irrelevant to the query. For example, the last key examined in block 134 is "rightorder finance". Block 135 has no department keys, however, the B+tree algorithm needs to read block 135 since it may include a department. For example, if "rightorder" had a "research" department it would reside in block 135.

Figure 14:
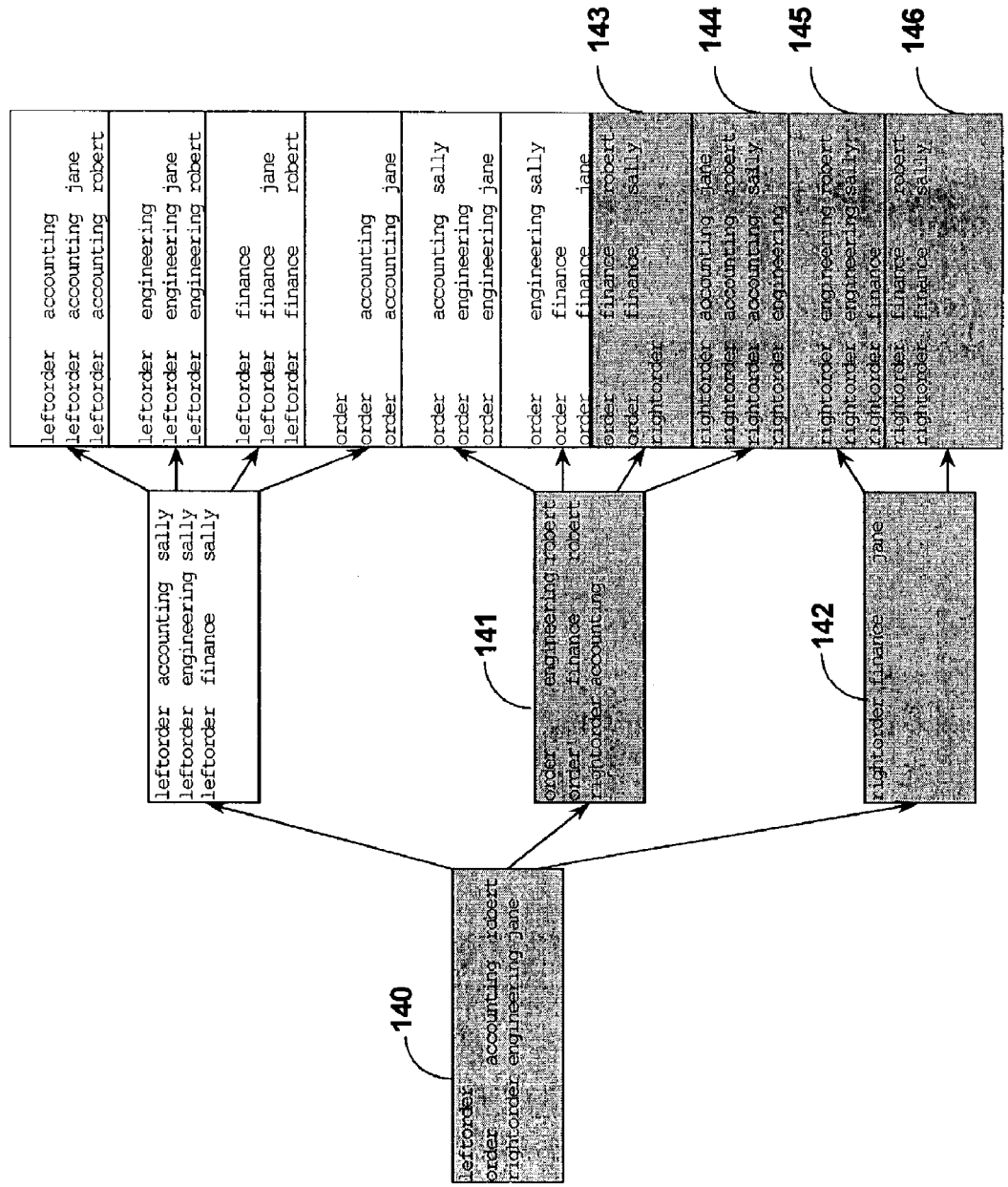
FIG. 14 illustrates Examined blocks in Btree, according to the prior art.

Assuming a standard Btree, FIG. 14 shows which blocks must be examined (140-146). Note that an extra internal block (one more than the B+tree) must be examined because a department belonging to the company "rightorder" may appear at any level of the Btree.

Note that the Btree (as the B+tree) can't determine if a block is relevant for the search without examining the content of the block. For example, block 143 is not needed to satisfy the query, however, it is read since it can potentially include a department. Block 146 is not needed to satisfy the query but is read since it can potentially include a department (such as "rightorder research").

Figure 15:
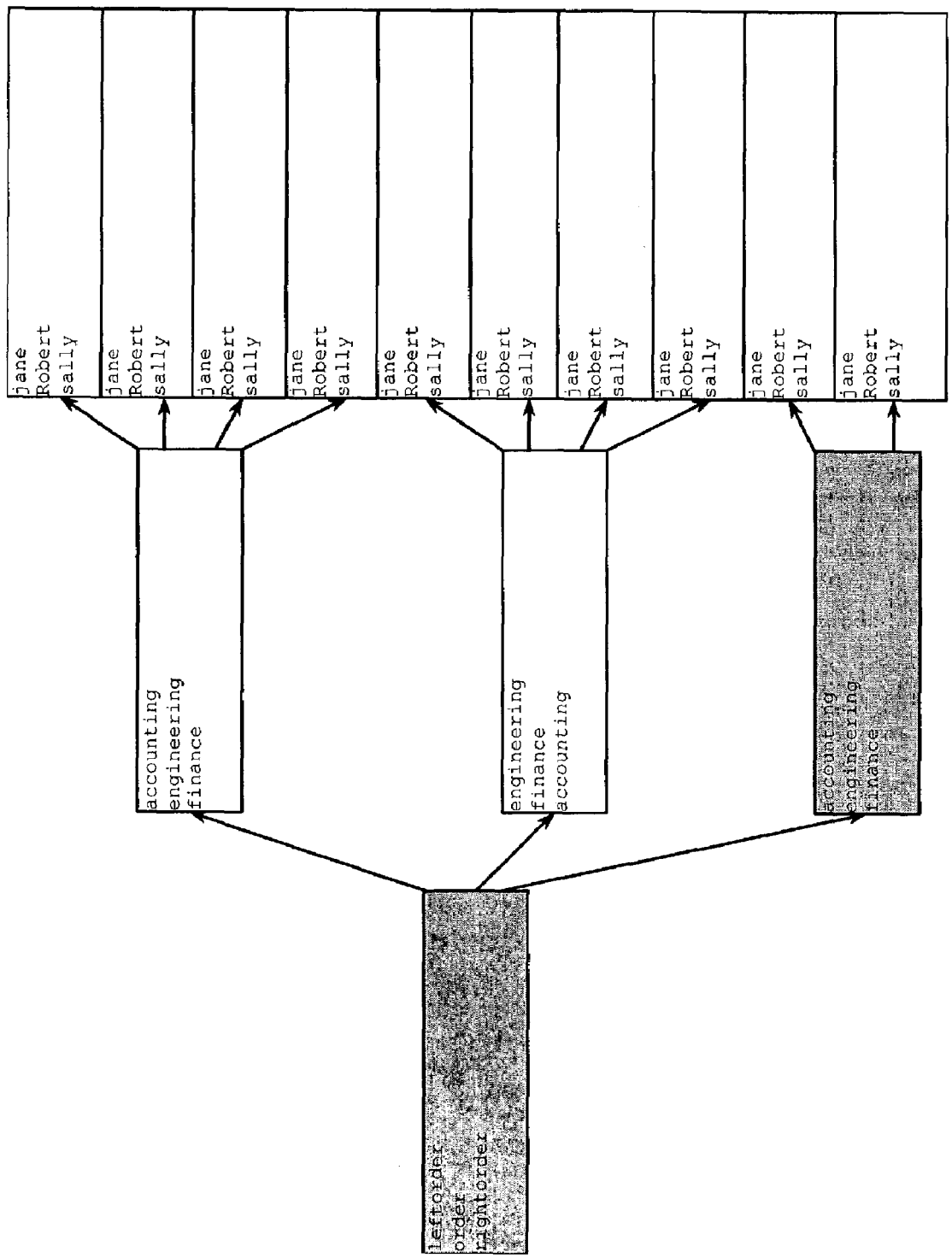
FIG. 15 illustrates Examined blocks in IOT.

Assuming an IOT Btree, FIG. 15 shows which blocks must be examined. Note that only two blocks must be examined, in contrast to the six for a B+tree or the seven for a standard Btree.

However, the IOT is limited in its applicability to efficiently support key lookups—as can be seen from FIG. 15, efficiency in a point lookup depends on the place of the key in the hierarchy. A search for a company can be satisfied with a single lookup since company is at the top of the hierarchy. A search for a department of a company can be satisfied with two lookups since departments are subordinated to companies and appear in the second layer of the index, a search for employee of a department within a company is satisfied by three lookups as of its place in the hierarchy.

The second limitation of the IOT is not being able to support different types of information within a particular level of the hierarchy. For example, if it is needed to update the list of managers for each department, there is no mechanism in the IOT to include the managers in the third layer of the tree hence this layer is used to store the keys of the employees.

Figure 16:
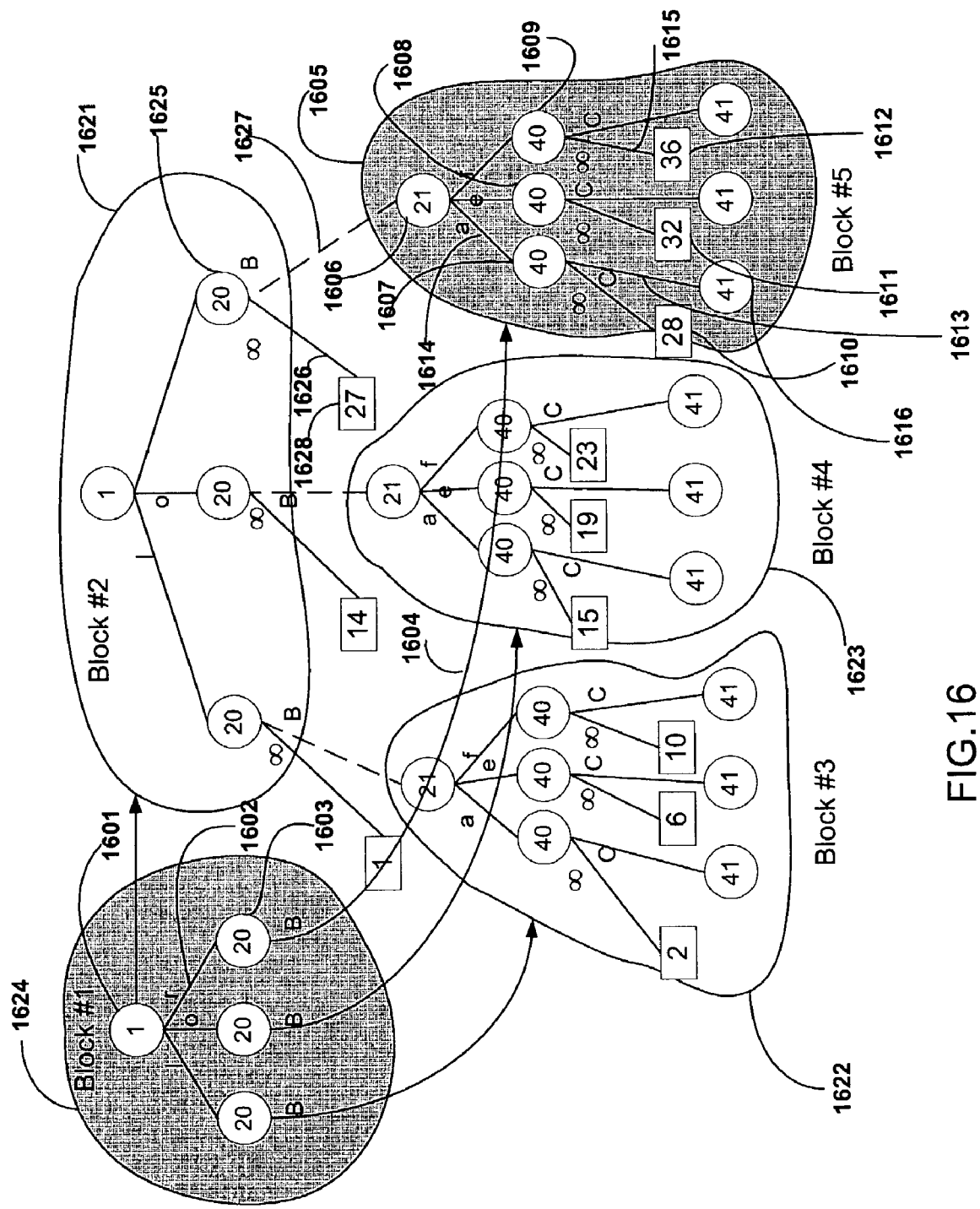
FIG. 16 illustrates Examined blocks in Layered Index.

Assuming a Layered Index, FIG. 16 shows which blocks must be examined—#1 and #5 (1624, 1605 respectively). Note that only two blocks must be examined, in contrast to the six for a B+tree or the seven for a standard Btree. Since the preferred embodiment of the Layered Index uses Patricia trie in the blocks of the index, the Layered Index achieves larger compression than the Btree based techniques (including the IOT). Thus, for the same keys, the number of blocks needed in the such Layered Index would be smaller than the number of blocks in the Btree based techniques.

The search in a (designated) Layered Index would use the key "Arightorder . . . " to search for the sub-tree with the related (children) information. The search process starts in the root node (1601) of the root block, continues using the link labeled "r" (1602) standing for the first character of "rightorder", the node with the value 20 (1603), the link labeled "B" (1604) standing for the designator "B" for departments. This link address the block #5 (1605), thus the search continues with node 21 (1606) that differentiates between the different departments of "rightorder". Now, the search continues depth first post order to examine the departments. The node with the value 40 (1607) that leads to department accounting (1610) is accessed first. The search skips the link labeled "C" (1613) as it leads to data subordinated to accounting and thus not relevant to the query. This is known since the node with the value (40) (1607) stands for the end position of the department string (in another application the sub-tree being skipped, rotted with the node with the value 41 (1616) extends over multiple blocks). The search now continues to the node with the value 40 (1608) that leads to department engineering (1611). Again, the sub-tree is being skipped and the search ends at the node with the value 40 (1609) and the department finance (1612) which is accessed by link 1615 (labeled null). The related sub-tree to the children is ignored. This procedure allowed to satisfy the query with minimal block accesses, the traversal in the leaf layer was based on the trie (Patricia trie in the example), the subordinated departments (1610, 1611, 1612) were retrieved by the order of their keys, whereas the structure of the Layered Index is balanced (from the root block 1624 to the leafs 1621, 1622, 1623, and 1605). In order to maintain the departments (of each company) clustered in the same block (or in minimal number of blocks) even if more information is added to each department, splits would be done at the sub-trees related to each department, such as at the link 1613 (assuming more data was updated for department accounting (1610) rather than (for example) the link 1614 that would separate between the department "accounting" and the other departments).

As can be seen in this example, the blocks #2, #3, #4, and #5 (1621, 1622, 1623, and 1605 respectively), stand for the leaf layer (whereas block #1 (1624) is a non-leaf layer block). These leaf layer blocks maintain an index (a Patricia index) over the keys of the data elements (similar to the Patricia index of FIG. 6). Due to the properties of trie, children elements (or subordinate elements) are indexed from a sub-tree whereas the root of the sub-tree can be searched by the key of the parent. For example, the rightorder's departments appear in a sub-tree rooted at the node with the value 20 (1625). The root node (1625) can be found by the key of the parent ("Arightorder") and in particular implementations maintains a link (such as 1626) to the key (or data record containing the key) "Arightorder" (1628). The links to the departments appear in the sub-tree that includes, for example, the link 1615 to the department finance (1612).

It can also be noted in this example that the key of the company ("Arightorder . . . ") is the prefix of the key of its children, for example, the key of the department accounting is: "Arightorder . . . . Baccounting . . . ".

As have been explained and demonstrated, the Layered Index does not suffer from the limitations of the IOT: first, key lookups are satisfied using the additional index layers thus every search by a particular key is done with the same number of 10s (regardless of its hierarchical position) resulting with a similar efficiency for a search of a parent or a child, and second, any type of information can be added at any level (as exemplified, for example, in FIG. 7-A showing a manager name (752) updated to a particular department (accounting (731)) in addition to the employee information). For clarity and as explained in the U.S. Pat. No. 6,175,835 B1, the index can have multiplicity of implementations, for example, the (split) link 1627 of FIG. 16 does not need to physically exist (and thus the navigation to the sub-tree in block #5 from node 1625 is done using the appropriate link from block #1 (the link labeled B from node 1603 to block #5). In another example, in a particular implementation, the link to a parent is not maintained explicitly in the index rather is stored as a link from a child element to its parent (as explained for example with respect to FIG. 13E in the U.S. Pat. No. 6,175,835 B1).

The present invention has been described with a certain degree of particularity, but those versed in the art will readily appreciate that various alterations and modifications can be carried out without departing from the scope of the following claims:

1. A computer program product that includes a storage medium used by a database file management system, executed on data processing system, the storage medium includes a data structure comprising:
    an index, partitioned into blocks, over keys representing hierarchical data;
    leaf blocks of said index are associated with data records;
    said hierarchical data is represented by keys of type $K(i)$ as a parent and for each parent 0 or more children of the type $K(i)+J(1) \ldots K(i)+J(n)$;
    said index facilitates search;
    to satisfy a query for parent data, said index facilitates a traversal from the position in the index that represents a parent $K(i)$ to the position in the index that represents the sequentially next parent $K(i+1)$, skipping over the sub-index that represents the children $K(i)+J(1) \ldots K(i)+J(n)$;
    the index further facilitates a query for a parent and its children, by traversal from the position in the index that represents $K(i)$ to the positions in the index that represent the children $J(1) \ldots J(n)$ of said $K(i)$;
    said index maintains the key order; and
    said index constitutes a balanced structure of blocks.

2. The computer program product of claim 1,
    wherein each leaf block of said index maintains at least a sparse trie over data records addressed from the block.

3. The computer program product of claim 1,
    wherein said index includes at least a Patricia trie over the keys of the data records.

4. The computer program product of claim 1,
    wherein said index is a designated index.

5. The computer program product of claim 1,
    wherein said index is a layered index.

6. The computer program product of claim 4,
    wherein said index is a layered index.

7. The computer program product of claim 1, wherein said index does not require that the complete key values are stored in the index.

8. The computer program product of claim 1,
    wherein each block of said index contains at least compressed information identifying keys accessible from such block and links such that data records can be found according to their key;
    the index facilitates the process of searching for a data record according to its key by reading a series of blocks composed of a root block and additional 0 or more blocks and a data record addressed by the leaf block of the said series of blocks such that the link to each additional block in the series or to the data record is found by applying a formula based on the compressed information in each previously read block and the key of the searched data record;
    in case of erroneous search path it is possible to decide that the searched data record does not exist or to initiate a new search by adding the information found during the search to the search formula; and
    the process is repeated until the data record is found or being able to decide that the searched data record does not exist.

9. The computer program product of claim 1, further comprising:
    for each parent, links to its children appear in a sub-tree in a leaf layer, the
    index facilitates a search to a root of the sub-tree by the key of the parent.

10. The computer program product of claim 1,
    wherein said hierarchical data being semi-structured data.

11. The computer program product of claim 1,
    wherein more than one type of key exists in a particular level of the hierarchy.

12. The computer program product of claim 1,
    wherein the search for a parent by the key of the parent and a search of a child by the key of the child are done in similar efficiency.

13. The computer program product of claim 12,
    wherein said index is a designated index.

14. The computer program product of claim 13,
    wherein said index is a layered index.

15. The computer program product of claim 1,
    wherein the index is further characterized in that for every 2 consecutive keys $(K(i),K(i+1))$ where the first $K(i)$ key has children such that the size in the index to represent $K(i)$ and his children is equal or larger than a block, it is possible to possible to partition the index such that $K(i)$ and the consecutive $K(i+1)$ reside in the same block.

16. In storage medium used by a data base file management system executed on data processing system, that includes:
    a tree based index, partitioned into blocks, over keys representing hierarchical data;
    said keys include keys of parent records;
    one or more parent records have children such that a key of each child record is prefixed by the key of its parent;
    said index includes a sub-index such that is an index over the keys of the children of a parent;
    said index maintains a balanced structure of blocks;
    a method for searching in the index by a key; and
    said key is the prefix of the key of or more parents including:
        retrieving a first parent;
        said method is further capable, if the first parent has children, to retrieve the children of said first parent; and
        said method is further capable, if a next parent is available, to retrieve the next parent skipping over the children of the first parent.

17. The method of claim 16,
    wherein said index is a designated index.

18. The method of claim 16,
wherein said index is layered index.

19. The method of claim 16,
wherein said index allows clustering of links to data records according to the type of the data records.

20. The method of claim 19,
wherein said index further allows alternative clustering links to a parent together with links to its children.

21. The method of claim 16,
wherein, said index is a designated index; the keys of the children include at least 2 keys in the same hierarchy; and the said 2keys have different designators.

22. The method of claim 16,
wherein said hierarchical data being semi-structured data.

\* \* \* \* \*